United States Patent
Ohga

(10) Patent No.: US 7,230,737 B1
(45) Date of Patent: Jun. 12, 2007

(54) IMAGE PROCESSING METHOD AND APPARATUS

(75) Inventor: Manabu Ohga, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 1056 days.

(21) Appl. No.: 09/662,756

(22) Filed: Sep. 15, 2000

(30) Foreign Application Priority Data

Sep. 17, 1999 (JP) ................................. 11-263918
Aug. 31, 2000 (JP) ............................. 2000-263150

(51) Int. Cl.
*G06F 15/00* (2006.01)
*G06K 12/00* (2006.01)
*G03F 3/08* (2006.01)

(52) U.S. Cl. ...................... 358/1.9; 358/518; 358/2.1
(58) Field of Classification Search .............. 358/1.9, 358/518, 515, 520, 523, 539, 540, 529, 2.1; 382/167, 162, 165

See application file for complete search history.

(56) References Cited

U.S. PATENT DOCUMENTS

| | | | | |
|---|---|---|---|---|
| 5,033,857 A | * | 7/1991 | Kubota et al. ............... | 356/402 |
| 5,057,913 A | * | 10/1991 | Nagata et al. ............... | 358/302 |
| 5,172,224 A | * | 12/1992 | Collette et al. ............. | 358/515 |
| 5,239,370 A | * | 8/1993 | Yamaguchi .................. | 358/518 |
| 5,268,753 A | * | 12/1993 | Yamaguchi .................. | 358/527 |
| 5,289,297 A | * | 2/1994 | Bollman et al. ............. | 358/537 |
| 5,309,258 A | * | 5/1994 | Kouno et al. ................ | 358/523 |
| 5,315,416 A | * | 5/1994 | Taniuchi et al. ............ | 358/537 |
| 5,335,097 A | * | 8/1994 | Murakami .................... | 358/520 |
| 5,446,476 A | * | 8/1995 | Kouzaki ....................... | 347/232 |
| 5,461,493 A | * | 10/1995 | Venable ....................... | 358/520 |
| 5,463,480 A | * | 10/1995 | MacDonald et al. .......... | 358/520 |
| 5,563,720 A | * | 10/1996 | Edgar et al. ................. | 358/447 |
| 5,581,372 A | * | 12/1996 | Kerz ............................ | 358/3.14 |
| 5,668,890 A | * | 9/1997 | Winkelman .................. | 382/167 |
| 5,677,736 A | * | 10/1997 | Suzuki et al. ............ | 375/240.24 |
| 5,696,611 A | * | 12/1997 | Nishimura et al. .......... | 358/518 |
| 5,717,783 A | * | 2/1998 | Endo et al. .................. | 382/167 |
| 5,717,838 A | * | 2/1998 | LeClair ........................ | 358/1.9 |
| 5,721,628 A | * | 2/1998 | Takaragi et al. ............. | 358/518 |
| 5,754,682 A | | 5/1998 | Katoh .......................... | 382/162 |
| 5,852,675 A | * | 12/1998 | Matsuo et al. .............. | 382/167 |
| 5,881,209 A | * | 3/1999 | Stokes ......................... | 358/1.9 |
| 5,909,291 A | * | 6/1999 | Myers et al. ................ | 358/523 |

(Continued)

FOREIGN PATENT DOCUMENTS

JP 363272166 A * 11/1988

(Continued)

OTHER PUBLICATIONS

U.S. Appl. No. 08/712,262, filed Sep. 11, 1996.

(Continued)

*Primary Examiner*—Madeleine A V Nguyen
(74) *Attorney, Agent, or Firm*—Fitzpatrick, Cella, Harper & Scinto

(57) ABSTRACT

An image processing method for inputting a color image signal and correcting the color image signal according to an observation condition, comprising the steps of: judging whether or not the input color image signal represents achromatic color; and controlling the correction according to the judged result, thereby enabling to excellently and satisfactorily perform color reproduction to achromatic color even under different observation conditions.

18 Claims, 16 Drawing Sheets

U.S. PATENT DOCUMENTS

| | | | |
|---|---|---|---|
| 5,940,049 A * | 8/1999 | Hinman et al. | 353/20 |
| 5,943,680 A * | 8/1999 | Shimizu et al. | 715/528 |
| 5,963,201 A * | 10/1999 | McGreggor et al. | 715/722 |
| 5,966,462 A * | 10/1999 | Linder et al. | 382/173 |
| 5,991,511 A * | 11/1999 | Granger | 358/1.9 |
| 6,008,907 A * | 12/1999 | Vigneau et al. | 358/1.9 |
| 6,041,136 A | 3/2000 | Ohga | 382/162 |
| 6,068,361 A * | 5/2000 | Mantell | 347/15 |
| 6,075,886 A * | 6/2000 | de Queiroz | 382/164 |
| 6,115,092 A * | 9/2000 | Greene et al. | 349/74 |
| 6,118,455 A | 9/2000 | Hidaka et al. | 345/431 |
| 6,195,456 B1 * | 2/2001 | Balasubramanian et al. | 382/167 |
| 6,198,552 B1 | 3/2001 | Nagae | 358/518 |
| 6,204,939 B1 * | 3/2001 | Lin et al. | 358/518 |
| 6,225,974 B1 * | 5/2001 | Marsden et al. | 345/590 |
| 6,226,011 B1 * | 5/2001 | Sakuyama et al. | 345/600 |
| 6,292,269 B1 * | 9/2001 | Kawai | 358/1.9 |
| 6,320,980 B1 * | 11/2001 | Hidaka | 382/167 |
| 6,323,969 B1 * | 11/2001 | Shimizu et al. | 358/523 |
| 6,330,085 B1 * | 12/2001 | Yamamoto et al. | 358/538 |
| 6,362,808 B1 * | 3/2002 | Edge et al. | 345/601 |
| 6,373,531 B1 | 4/2002 | Hidaka et al. | 348/603 |
| 6,421,141 B2 * | 7/2002 | Nishikawa | 358/1.9 |
| 6,459,436 B1 * | 10/2002 | Kumada et al. | 345/590 |
| 6,480,202 B1 * | 11/2002 | Deguchi et al. | 345/600 |
| 6,542,634 B1 * | 4/2003 | Ohga | 382/167 |
| 6,560,358 B1 * | 5/2003 | Tsukada | 382/167 |
| 6,577,395 B1 * | 6/2003 | Berns et al. | 356/402 |
| 6,608,925 B1 * | 8/2003 | Edge et al. | 382/162 |
| 6,693,731 B1 | 2/2004 | Ohnuma et al. | 358/529 |
| 6,766,263 B1 * | 7/2004 | Stokes | 702/88 |
| 6,859,551 B2 * | 2/2005 | Ohga | 382/167 |
| 2004/0022434 A1 * | 2/2004 | Yamazoe et al. | 382/168 |

FOREIGN PATENT DOCUMENTS

| | | | |
|---|---|---|---|
| JP | 1-281524 | | 11/1989 |
| JP | 405316334 A | * | 11/1993 |
| JP | 07-222196 | | 8/1995 |
| JP | 09-027915 | | 1/1997 |
| JP | 09-046539 | | 2/1997 |
| JP | 09-093451 | | 4/1997 |
| JP | 9-102882 | | 4/1997 |
| JP | 10-322561 | | 12/1998 |
| JP | 11-055538 | | 2/1999 |
| JP | 411205813 A | * | 7/1999 |

OTHER PUBLICATIONS

U.S. Appl. No. 08/827,500, filed Mar. 28, 1997.
U.S. Appl. No. 09/358,408, filed Jul. 22, 1999.
U.S. Appl. No. 09/358,410, filed Jul. 22, 1999.

* cited by examiner

IMAGE PROCESSING METHOD AND APPARATUS

BACKGROUND OF THE INVENTION

1. Field of the Invention

The present invention relates to image processing apparatus and method, and more particularly relates to image processing method and apparatus which perform correction according to an observation condition, and a recording medium.

2. Related Background Art

FIG. 1 is a conceptual diagram showing general color matching.

Input data (R, G and B data) is converted into X, Y and Z data in a color space independent of a device by an input profile. Since color outside a color reproduction range of an output device can not be represented by this output device, color gamut mapping is performed to the input data converted into the device-independent color space data such that all colors can be held within the color reproduction range of this output device. After the color gamut mapping is performed, the input data in the device-independent color space is converted into C, M, Y and K data in a color space dependent on the output device.

In the color matching, a standard white point and environment light are fixed. For example, in a profile defined by ICC (International Color Consortium), a PCS (profile connection space) for connecting profiles is represented by XYZ values and Lab values based on reference light D50. For this reason, when an input original and a printed output are observed under a light source of D50 characteristic, correct color reproduction is guaranteed. However, the correct color reproduction is not guaranteed under light sources of other characteristics.

In a case where an identical sample (e.g., an image) is observed under the different light sources, the XYZ values for the observed sample are naturally different from others. Thus, in order to predict the XYZ values under the different light sources, there are various conversion methods such as (1) a ratio conversion method, (2) a Von Kries conversion method, (3) a prediction expression method based on a color perception model, and the like.

In the ratio conversion method, in order to convert the XYZ values under a standard white point W1 into the XYZ values under a standard white point W2, ratio conversion of W2/W1 is performed. If this method is applied to an Lab uniform color space, an Lab value under the standard white point W1 coincides with an Lab value under the standard white point W2. For example, if the XYZ values of a sample under the standard white point W1($X_W1$, $Y_W1$, $Z_W1$) are assumed to (X1, Y1, Z1) and the XYZ values of a sample under the standard white point W2($X_W2$, $Y_W2$, $Z_W2$) are assumed to (X2, Y2, Z2), the following relation can be obtained by the ratio conversion method.

$$X2 = (X_W2/X_W1) \cdot X1$$

$$Y2 = (Y_W2/Y_W1) \cdot Y1$$

$$Z2 = (Z_W2/Z_W1) \cdot Z1 \quad (1)$$

In the Von Kries conversion method, in order to convert the XYZ values under the standard white point W1 into the XYZ values under the standard white point W2, ratio conversion of W2'/W1' is performed in a human's color perception space PQR. If this method is applied to the Lab uniform color space, the Lab value under the standard white point W1 does not coincide with the Lab value under the standard white point W2. For example, if the XYZ values of a sample under the standard white point W1($X_W1$, $Y_W1$, $Z_W1$) are assumed to (X1, Y1, Z1) and the XYZ values of a sample under the standard white point W2($X_W2$, $Y_W2$, $Z_W2$) are assumed to (X2, Y2, Z2), the following relation can be obtained by the Von Kries conversion method.

$$\begin{bmatrix} X2 \\ Y2 \\ Z2 \end{bmatrix} = [\text{inv\_Mat}] \begin{bmatrix} P_W2/P_W100 \\ OQ_W2/Q_W10 \\ OOR_W2/R_W1 \end{bmatrix} [Mat] \begin{bmatrix} X1 \\ Y1 \\ Z1 \end{bmatrix} \quad (2)$$

however, $$\begin{bmatrix} P_W2 \\ Q_W2 \\ R_W2 \end{bmatrix} = [Mat] \begin{bmatrix} X_W2 \\ Y_W2 \\ Z_W2 \end{bmatrix} \quad (3)$$

$$\begin{bmatrix} P_W1 \\ Q_W1 \\ R_W1 \end{bmatrix} = [Mat] \begin{bmatrix} X_W1 \\ Y_W1 \\ Z_W1 \end{bmatrix} \quad (4)$$

$$[\text{inv\_Mat}] = \begin{bmatrix} 1.85995 & -1.12939 & 0.21990 \\ 0.36119 & 0.63881 & 0 \\ 0 & 0 & 1.08906 \end{bmatrix} \quad (5)$$

$$[Mat] = \begin{bmatrix} 0.44024 & 0.70760 & -0.08081 \\ -0.22630 & 1.16532 & 0.04570 \\ 0 & 0 & 0.91822 \end{bmatrix} \quad (6)$$

In the prediction expression method based on the color perception model, in order to convert the XYZ values in an observation condition VC1 (including the standard white point W1) into the XYZ values in an observation condition VC2 (including the standard white point W2), for example, such the conversion is performed in a human's color perception space QMH (or JCH) such as CIE CAM97s. Here, in the human's color perception space QMH, symbol "Q" represents brightness, symbol "M" represents colorfulness, and symbol "H" represents a hue quadrature or a hue angle. In the human's color perception space JCH, symbol "J" represents lightness, symbol "C" represents chroma, and symbol "1" represents a hue quadrature or a hue angle. If this method is applied to the Lab uniform color space, as well as the Von Kries conversion method, the Lab value under the standard white point W1 does not coincide with the Lab value under the standard white point W2. For example, if the XYZ values of a sample under the standard white point W1($X_W1$, $Y_W1$, $Z_W1$) are assumed to (X1, Y1, Z1) and the XYZ values of a sample under the standard white point W2($X_W2$, $Y_W2$, $Z_W2$) are assumed to (X2, Y2, Z2), the following conversion is performed by the prediction expression method based on the color perception model.

(X1, Y1, Z1)→[CIE CAM97s forward conversion]

→(Q,M,H) or (J,C,H)

→[CIE CAM97s inverse conversion]→(X2, Y2, Z2)

Namely, if it is assumed that the XYZ values under the different reference standard white points can be converted by the ratio conversion method, an equal-interval hue line of the Lab color space under the different standard white point is always constant. However, when human's color perception is considered as in the Von Kries conversion method and the prediction expression method based on the color perception model, the equal-interval hue line of the Lab color space under the different standard white point is different according to the standard white point.

Because of the above reason, in the color matching between the different standard white points, when color gamut mapping (hue conservation) defined in the identical Lab color space is applied, it might be felt by human's sight that hue is not constant.

Further, in the current ICC profile, since the PCS is limited to the XYZ values and the Lab values based on the reference light D50, it is impossible to perform the color matching corresponding to the environment light.

Further, there is a method that color not depending on the PCS and the device is represented by an RGB space which can be linearly converted from the XYZ space by a 3×3 matrix. However, when such the conversion matrix is fixed by the standard white point, there is following problems.

Namely, when the colors under the different standard white points are converted by the conversion matrix under which the standard white point is fixed, overflow and underflow occur in the device-independent RGB space, whereby there is some fear that some colors (especially, colors in the vicinity of a white point) can not be represented. In a three-dimensional LUT (look-up table) for which the device-independent RGB space is used as an input color space, when grays under the different standard white points are input, since these grays are not on a diagonal axis of the three-dimensional LUT, linear interpolation using three or more lattice points is performed in tetrahedron interpolation, whereby there is some fear that color misregistration occurs.

Further, when a linear model such as the Von Kries conversion method or the like is used to predict the XYZ values under the different light sources, gray (achromatic color) under an input-side standard white point is converted into gray under an output-side standard white point. However, when a nonlinear model such as a color adaptation equation (CIE CAT94), a color perception model (CIE CAM97s) or the like is used, there is a case where the gray converted in the color matching does not represent the gray under the output-side standard white point. Here, the gray under the standard color point represents a set of colors having the same chromaticity as that of the standard white point.

Generally, a generation probability of the gray under the standard white point is extremely low in a natural image but very high in a graphics image. For this reason, since reproducibility of the gray becomes especially important when the graphics image on a monitor is printed, a specific process is frequently performed to the gray so as to improve the reproducibility. When the gray converted by using the nonlinear model such as the color perception model or the like does not represent the gray under the output-side standard white point, it is difficult to detect the gray by the output-side profile, whereby it is impossible to perform the specific process of, e.g., allocating gray of a printer device to the gray under the output-side standard white point.

SUMMARY OF THE INVENTION

The present invention is made to solve the above problems, and an object thereof is to be able to excellently and satisfactorily perform color reproduction to achromatic color even under different observation conditions.

In order to achieve the above object, according to the present invention, it is provided an image processing method which inputs a color image signal and corrects the input color image signal according to an observation condition, comprising the steps of:

judging whether or not the input color image signal represents achromatic color; and controlling the correction according to the judged result.

Other objects and features of the present invention will become apparent from the following detailed description and the attached drawings.

DETAILED DESCRIPTION OF THE PREFERRED EMBODIMENTS

Figure 1:
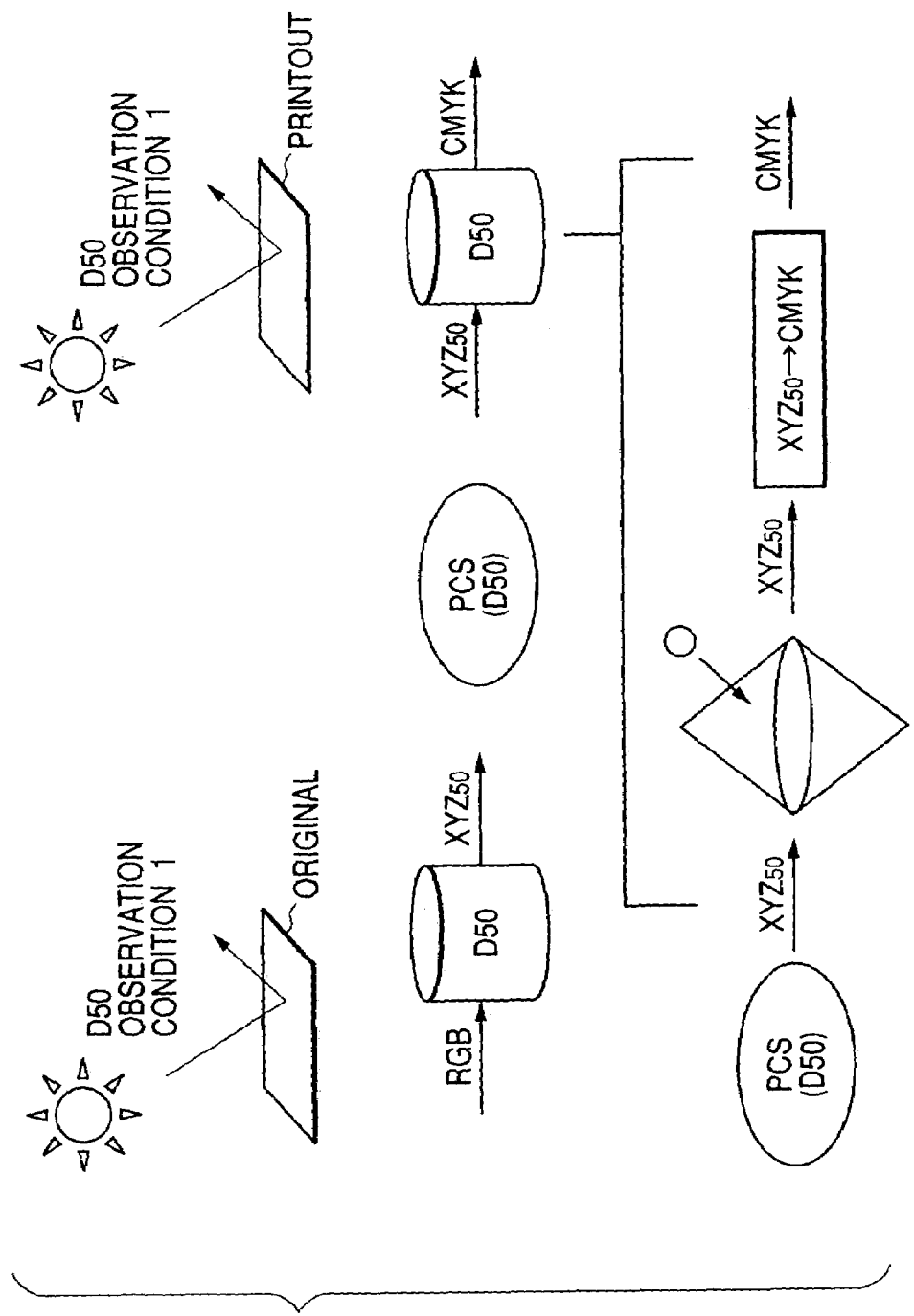
FIG. 1 is a conceptual diagram showing general color matching.

Hereinafter, an image processing apparatus according to one embodiment of the present invention will be explained in detail with reference to the attached drawings.

First, an example of CAM (color appearance model) in which a correction process according to an observation condition is performed will be explained.

It is known that color perceived by a human's sight system is sometimes seen or viewed as different color according to ambient conditions such as difference of illumination light, a background of a stimulus, and the like, even if light entered into human's eyes is the same.

For example, white irradiated by an incandescent lamp is not felt as red like a characteristic of light entered into the eyes. Further, when white in a black background is compared with white in a light background, the latter white is felt lighter. The former phenomenon is known as color adaptation, and the latter phenomenon is known as contrast. Therefore, it is necessary to represent color by a quantity corresponding to a degree of physiological revitalization of optic cells distributed like retina, whereby a color perception model is developed because of such a purpose. CIE (Commission Internationale de L'eclarage, International Commission Illumination) recommends use of CIE CAM97s. This color perception model uses physiological three principles of chromatic vision (color sense). For example, it is thought that the values of J (lightness), C (chroma) and H (hue), or Q (brightness), M (colorfulness) and H (hue) which are color perception correlative quantities calculated by CIE CAM97s represent a color display method independent of an observation condition. When color reproduction is performed such that the values of J, C and H or the values of Q, M and H become coincident between the devices, it is possible to eliminate or solve a difference of observation conditions between input and output images.

Process contents in forward conversion of the color perception model CIE CAM97s to perform a correction process (converting XYZ into JCH or QMH) according to the observation condition at a time when the input image is observed will be explained with reference to FIG. 13.

First, in a step S160, as observation condition information of the input image, luminance LA of adaptation field of view (cd/m$^2$; ordinarily 20% selected from the luminance of white in the adaptation field of view), relative tristimulus values XYZ of a sample in a light source condition, relative tristimulus values $X_W Y_W Z_W$ of white light in the light source condition, and relative luminance Yb of a background in the light source condition are set. Further, in a step S170, as observation condition information of the input image, a constant c of an ambient influence, a color induction coefficient Nc, a lightness contrast coefficient FLL and an adaptation coefficient F are set on the basis of an observation condition type designated in a step S180.

Then, a following process is performed to the values XYZ representing the input image on the basis of the input image observation condition information set in the steps S160 and S170.

First, a Bradford cone response RGB is obtained by converting the values XYZ based on Bradford's three primary colors which are considered as human's physiological three primary colors (step S100). Since human's sight is not always adapted completely to the observation light source, a variable D representing adaptation is obtained based on a luminance level and the ambient conditions (LA and F), and an imperfect adaptation process is performed to the response RGB based on the variable D and the values $X_W Y_W Z_W$ to obtain values RcGcBc (step S110).

Next, a Hunt-Pointer-Estevez cone response R'G'B' is obtained by converting the values RcGcBc based on Hunt-Pointer-Estevez's three primary colors which are considered as human's physiological three primary colors (step S120). Then, estimation of a degree of adaptation is performed to the response R'G'B' according to a stimulus intensity level, thereby obtaining an adaptation cone response R'aG'aB'a according to both the sample and white (step S130). In this step S130, non-linear response compression is performed by using a variable FL obtained based on the luminance LA of the adaptation field of view.

Next, a following process is performed to obtain a correlation between the adaptation cone response R'aG'aB'a and sight.

An opposite color response ab of red-green and yellow-blue is obtained from the adaptation cone response R'aG'aB'a (step S140), and the hue H is obtained from the opposite color response ab and an eccentricity coefficient (step S150).

Further, a background induction coefficient n is obtained from the value $Y_W$ and the relative luminance Yb of the background, and achromatic color responses A and $A_W$ concerning both the sample and white are obtained by using the background induction coefficient n (step S190). The lightness J is obtained on the basis of a coefficient z obtained from the background induction coefficient n and the lightness contrast coefficient FLL, the achromatic color responses A and $A_W$, and the ambient influence constant c (step S151). Further, saturation S is obtained based on the color induction coefficient Nc (step S153), the chroma C is obtained based on the saturation S and the lightness J (step S152), and brightness Q is obtained based on the lightness J and the white achromatic color response $A_W$ (step S154).

Further, the colorfulness M is obtained based on the variable FL and the ambient influence constant c (step S155).

Next, the embodiment that a profile is dynamically changed by using the correction process according to the above observation condition will be explained. In the present embodiment, a XYZ color space is used as a device-independent color space.

Figure 2:
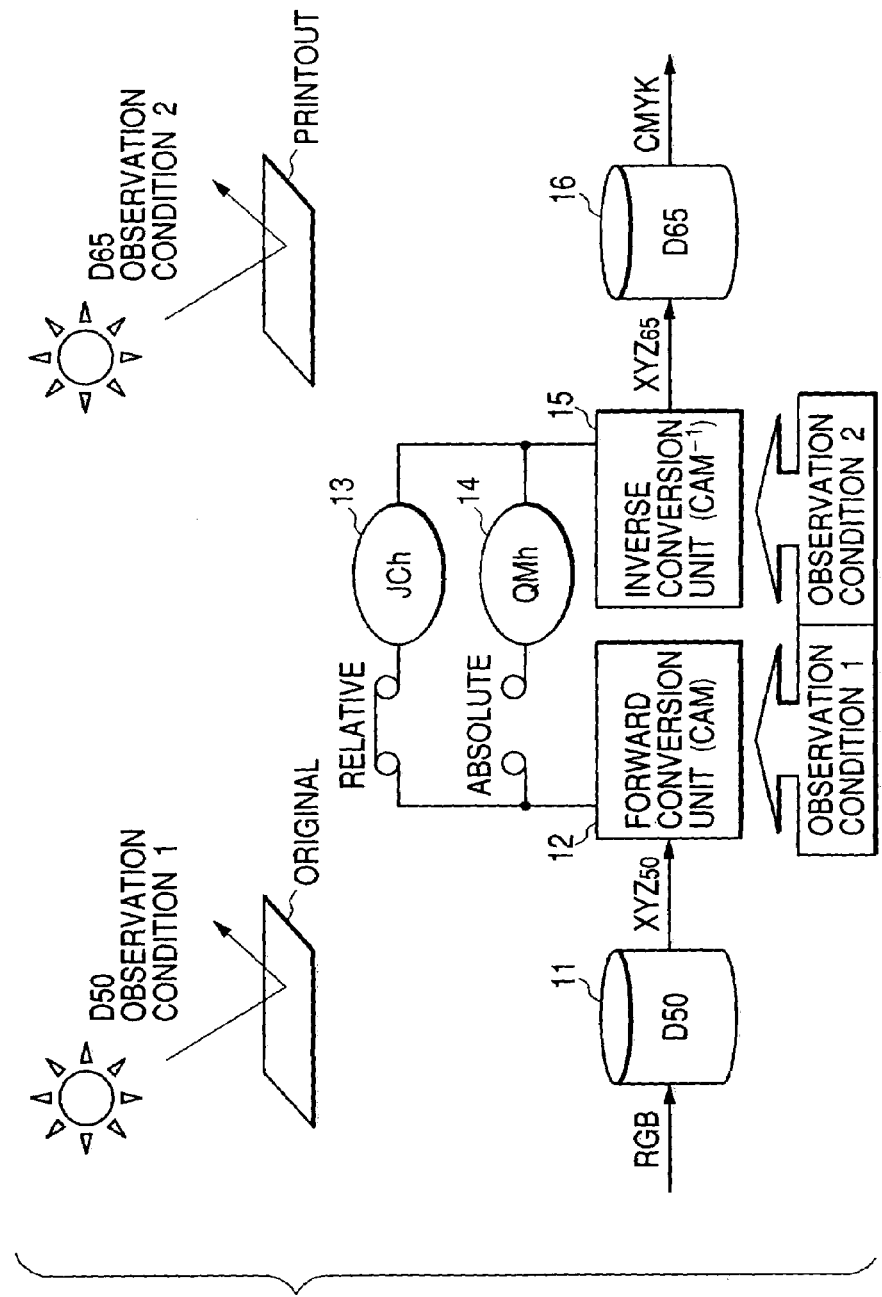
FIG. 2 is a diagram for explaining a concept of the present invention.

In FIG. 2, numeral 11 denotes a conversion matrix or a conversion LUT which converts data depending on an input device into the device-independent color space based on a white point standard of input-side environment light, numeral 12 denotes a color perception model forward conversion unit (CAM) which converts the data obtained from the conversion LUT 11 into a human's color perception color space JCh or QMh, numeral 13 denotes the relative color perception space JCh (or JCH) for the standard white of the environment light, numeral 14 denotes the absolute color perception space QMh (or QMH) of which size is changed according to an illumination level, numeral 15 denotes an inverse conversion unit of the color perception model which converts the human's color perception space JCh or QMh into the device-independent color space data based on a white point standard of output-side environment light, and numeral 16 denotes a conversion LUT which converts the data from the inverse conversion unit into color space data depending on an output device.

Generally, the white point of the environment light under the observation condition is different from a white point of a standard light source at a time when a color chip such as a color target, a color patch or the like is color-measured. For example, a standard light source used in the color measurement is a light source D50 or D65. However, environment light used in case of actually observing an image is not only the light sources D50 and D65 in a light booth but often also illumination light of an incandescent lamp or a fluorescent lamp, and mixture of illumination light and sun light. In the following, it is assumed that light source characteristics of the environment light under the observation condition are D55, D65 and D93 to simplify explanations. However, the XYZ values of the white point on a media are actually set as the white point.

Figure 3:
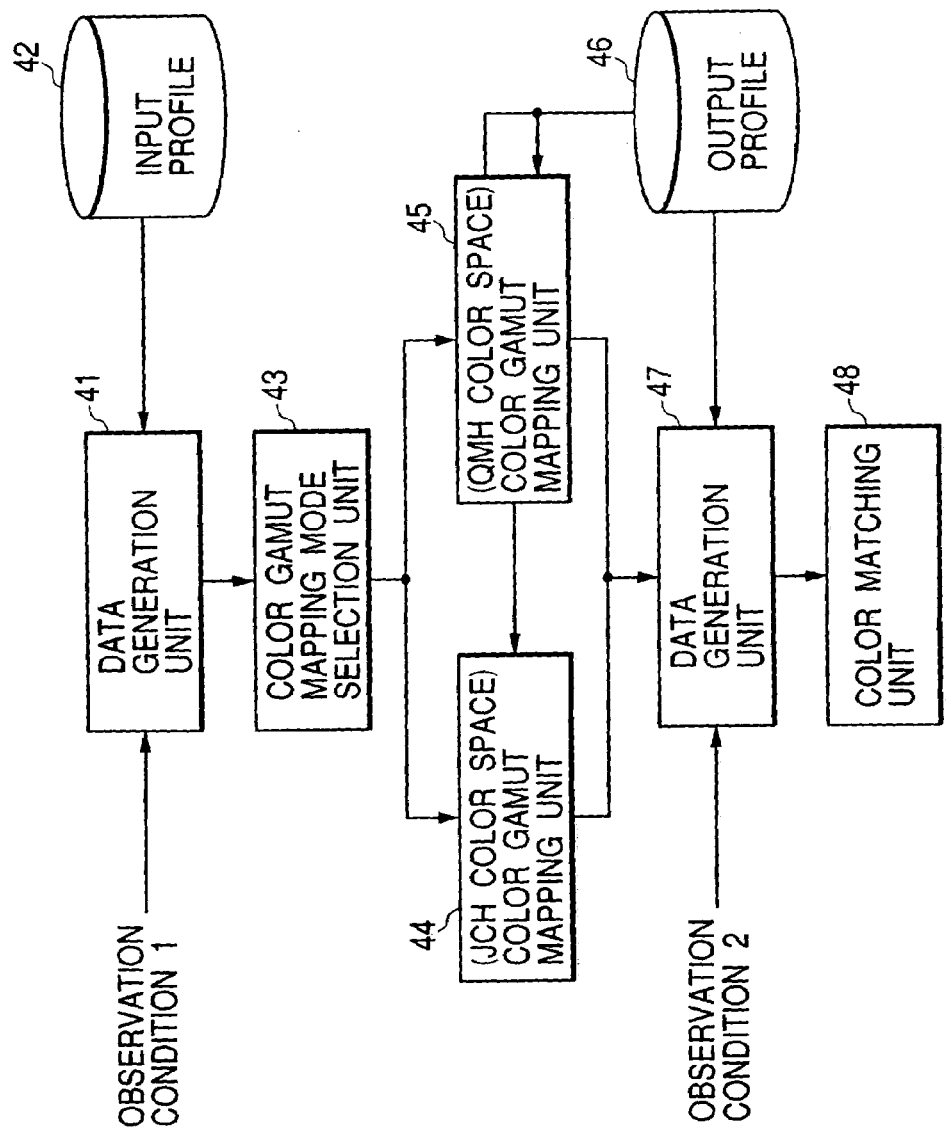
FIG. 3 is a block diagram showing a functional structure example of the first embodiment.

FIG. 3 is a block diagram showing a functional structure example of the present embodiment. In FIG. 3, numeral 41 denotes a data generation unit which generates data depending on an input-side observation condition 1, from an input profile 42 and the input-side observation condition 1. Numeral 43 denotes a color gamut mapping mode selection unit which selects whether color gamut mapping is to be performed in a JCH color space or a QMH color space on the basis of user's designation or a profile designation. Numerals 44 and 45 denote color space compression units which perform the color gamut mapping to the data respectively in a JCH color perception space and a QMH color perception space on the basis of an output profile 46. Numeral 47 denotes a data generation unit which generates data depending on an output-side observation condition 2, from the output profile 46 and the output-side observation condition 2. Numeral 48 denotes a color matching unit which performs color matching by using the data depending on the observation condition 1, the color gamut mapping data, the data depending on the observation condition 2 and a color perception model.

It is needless to say that the device for the present embodiment can be achieved by supplying software of achieving the function of FIG. 3 to a general-purpose computer device such as a personal computer. In this case, the software of achieving the function of the present embodiment may be included in an OS (operating system) of the computer device, or included in, e.g., driver software of input/output devices different from the OS of the computer device.

The input device which is the target of the present embodiment includes various image input devices such as a shooting (or photographing) equipment, an image reader and the like. It should be noted that the shooting equipment includes a digital still camera, a digital video camera or the like, and the image reader includes an image scanner, a film scanner or the like. Further, the output device includes various image output devices such as a color monitor (a CRT, an LCD or the like), a color printer, a film recorder and the like.

The input and output profiles used for the color matching are stored in a hard disk (HD). However, in addition to the HD, an optical disk such as a MO or the like can be used.

Hereinafter, an example that the color matching is performed by using the input and output profiles will be explained.

[Data Generation Depending on Observation Condition 1]

Figure 4:
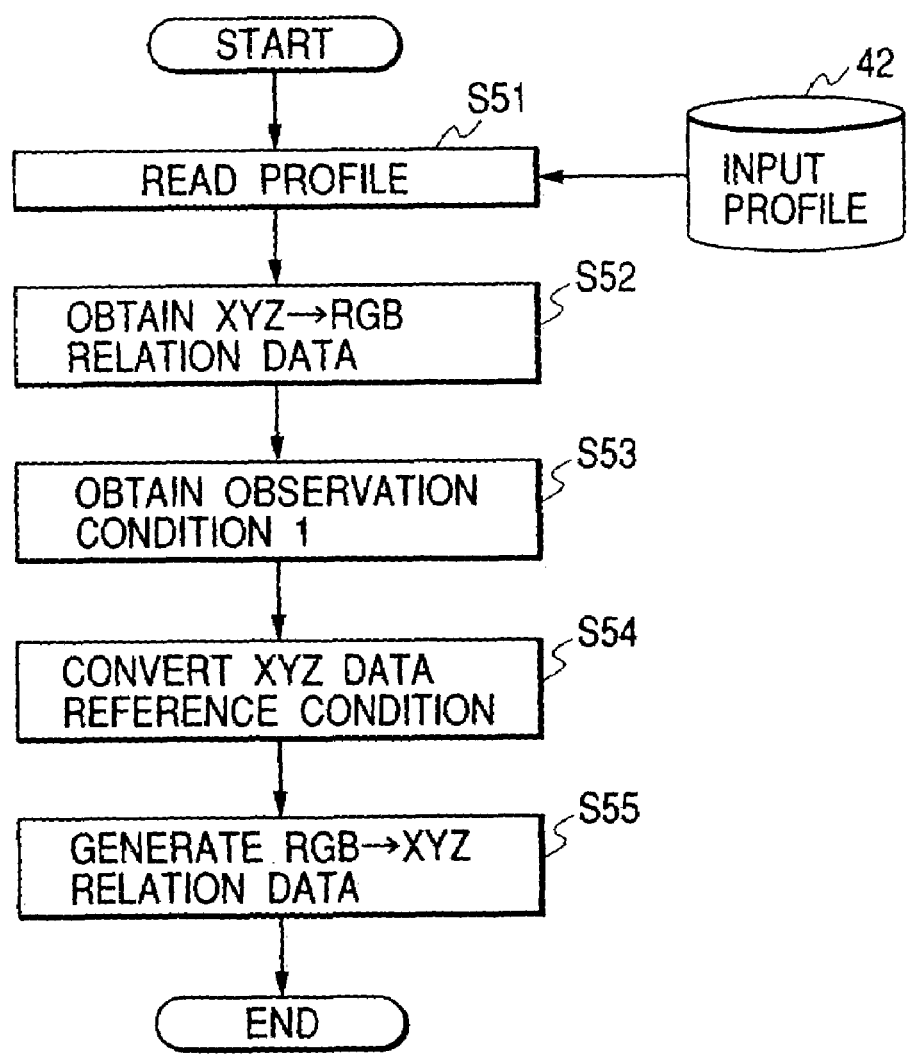
FIG. 4 is a flow chart showing a process example of restructuring a conversion LUT corresponding to environment light.
Figure 5:
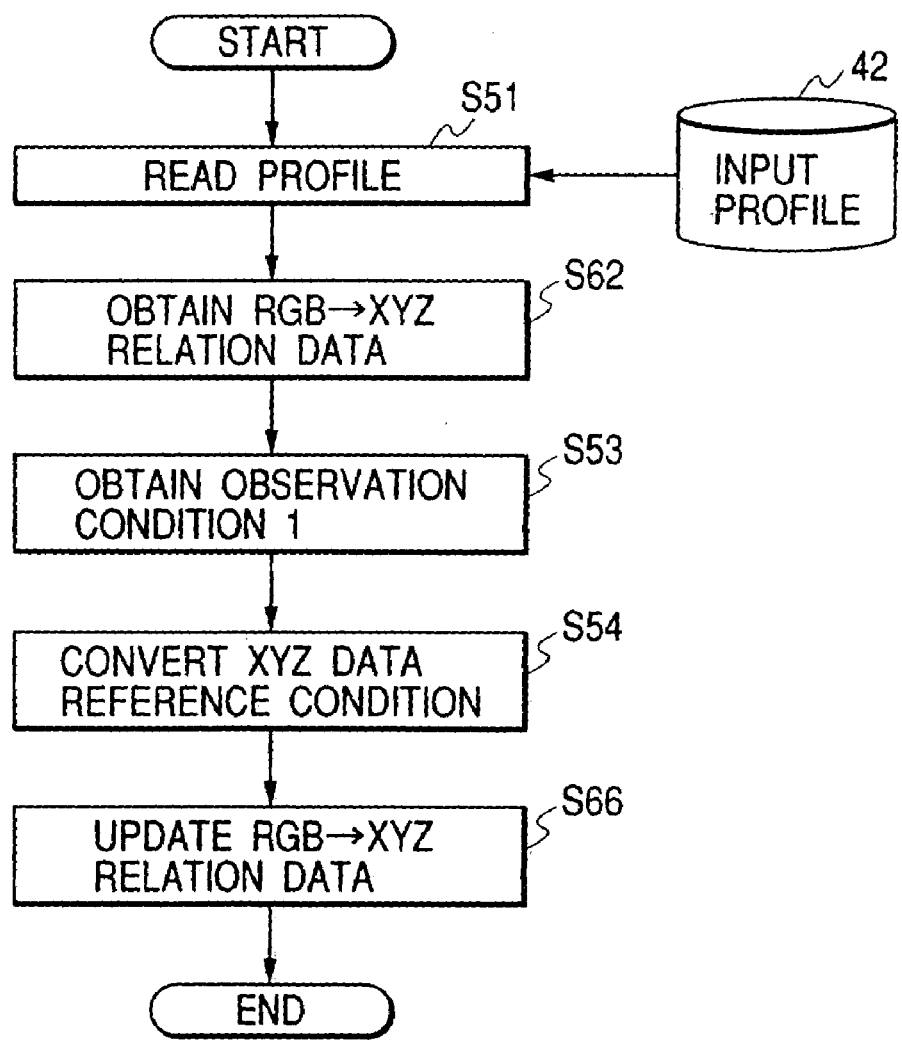
FIG. 5 is a flow chart showing a process example of updating the conversion LUT corresponding to environment light.

The conversion LUT 11 is generated by using the data generation unit 41. Here, there are two methods of generating the conversion LUT 11. FIG. 4 shows an example of one method that the conversion LUT 11 corresponding to the environment light is restructured from the relation between the XYZ values (or the Lab values) of the color target and the RGB values of the input device. FIG. 5 shows an example of the other method that the conversion LUT of converting the device RGB space in the input profile 42 into the XYZ space is updated to the conversion LUT 11 corresponding to the environment light.

FIG. 4 is the flow chart showing a process example of restructuring the conversion LUT 11 corresponding to the environment light.

In a step S51, a profile which was designated by a user is read from the input profile 42 to restructure the conversion LUT 11 corresponding to the environment light. In the input profile 42, XYZ→RGB relation data which correlates the XYZ values (or the Lab values) of the color target with the device RGB values at the time when this color target is read by one input device has been prestored. In a step S52, the XYZ→RGB relation data is fetched from the profile. Since the observation condition 1 has been also prestored in the profile, this observation condition 1 is fetched from the profile in a step S53.

Since the XYZ values of the XYZ→RGB relation data fetched in the step S52 are the data based on the standard light D50 or D65 at the time when the color target is measured, it is necessary to correct the XYZ values based on the measured color light source into the XYZ values based on the environment light. In a step S54, the XYZ values based on the measured color light source are converted into the human's color perception space JCH on the basis of the color perception model according to the D50 light source white point "case based on D50" being the color measurement condition, the illumination level, the ambient light state and the like. Then, the obtained values are inverse-converted into the XYZ values on the basis of the color perception model according to, e.g., the D60 light source white point being the observation condition 1 different from the color measurement condition, the illumination level, the ambient light state and the like, thereby obtaining the XYZ values based on the environment light. Thus, since the relation between the XYZ values based on the environment light and the device RGB values can be obtained, an RGB→XYZ conversion matrix based on RGB→XYZ relation data is formed in a step S55, and the obtained data is optimized by a repetition method or the like, whereby the conversion LUT 11 corresponding to the environment light can be obtained.

FIG. 5 is a flow chart showing a process example of updating the conversion LUT 11 corresponding to the environment light. It should be noted that the steps in which the same process as those in FIG. 4 are performed are added with the same symbols as those in FIG. 4, and the detailed explanation thereof is omitted.

Generally, since the conversion matrix (colorant tag) or the conversion LUT (AtoB0 tag) for performing the RGB→XYZ conversion has been stored in an ICC profile for the input device, the RGB→XYZ relation data is fetched from the profile in a step S62.

When the relation between the XYZ values based on the environment light and the device RGB values is obtained in the step S54, then the conversion matrix (colorant tag) or the conversion LUT (AtoB0 tag) in the profile are updated in a step S66, whereby the conversion LUT 11 corresponding to the environment light can be obtained.

Generally, the conversion matrix (colorant tag) or the conversion LUT (AtoB0 tag) for performing the RGB→XYZ conversion has been stored in the ICC profile for the input device. Further, although the examples of using the RGB→XYZ relation data were explained with reference to FIGS. 4 and 5, the present embodiment is not limited to this. Namely, other device-independent color data such as RGB→Lab relation data and the like can be used.

[Color Gamut Mapping Mode Selection and Color Gamut Mapping]

The color gamut mapping mode is selected by a user through a user interface or automatically selected by "Rendering Intent" in the header of the source-side profile. Namely, this mode is automatically selected on the basis of the profile, as follows.

| | |
|---|---|
| "Perceptual" | color gamut mapping mode in JCH color space |
| "Relative Colorimetric" | color gamut mapping mode in JCH color space |
| "Saturation" | color gamut mapping mode in JCH color space |
| "Absolute Colorimetric" | color gamut mapping mode in QMH color space |

Namely, the JCH color perception space 13 is selected in case of the relative color matching, while the QMH color perception space 14 is selected in case of the absolute color matching.

Figure 6:
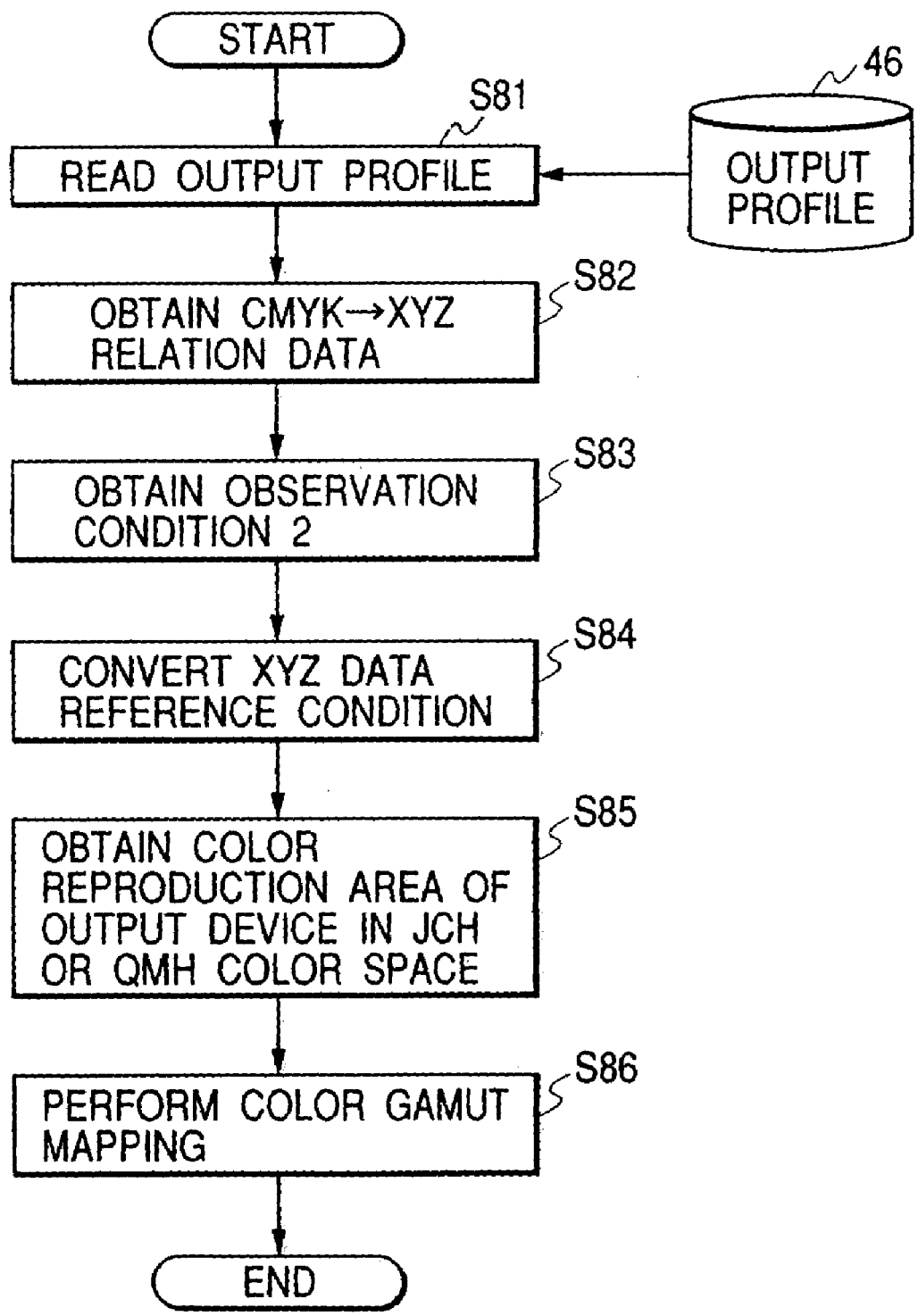
FIG. 6 is a flow chart showing a process example of performing color gamut mapping in a JCH color space or a QMH color space.

FIG. 6 is a flow chart showing a process example of performing the color gamut mapping in the JCH color perception space 13 or the QMH color perception space 14.

In a step S81, a profile which was designated by the user is read from the output profile 46 to perform the color gamut mapping in the color perception space.

Generally, a judgment LUT (gamut tag) to which the XYZ values or the Lab values are input has been stored in the output-device ICC profile in order to judge whether the input data is inside or outside the color reproduction area (simply called color reproduction area inside/outside judgment). However, since the XYZ values are based on the light source D50 or D65 being the characteristic of the color measurement light source, it is impossible to directly use such the XYZ values for the color reproduction area inside/outside judgment according to the environment light.

Therefore, CMYK→XYZ relation data is fetched and used from a conversion LUT (AtoB0 tag or the like) for performing CMYK→XYZ conversion stored in the profile, instead of the LUT (gamut tag) for performing the color reproduction area inside/outside judgment (step S82). Since the observation condition 2 has been also prestored in the output profile, this observation condition 2 is fetched from the profile in a step S83.

Since the XYZ values of the CMYK→RGB relation data fetched in the step S82 are the data based on the standard light D50 or D65 being the color measurement light, it is necessary to correct such the XYZ values into the XYZ values based on the environment light. In a step S84, the XYZ values based on the measured color light are converted into the human's color perception space JCH on the basis of the color perception model according to the D50 light source white point "case based on D50" being the color measurement condition, the illumination level, the ambient light state and the like. Then, the obtained values are inverse-converted into the XYZ values on the basis of the observation condition 2, e.g., the D65 light source white point, being different from the color measurement condition, the illumination level, the ambient light state and the like, thereby obtaining the XYZ values based on the environment light. Thus, in the step S84, the relation between the XYZ values based on the environment light and the device CMYK values is obtained. In a step S85, the color reproduction range of the output device in the color perception space JCH or QMH is obtained on the basis of the CMYK→XYZ (based on the environment light) relation data obtained in the step S84.

Figure 7:
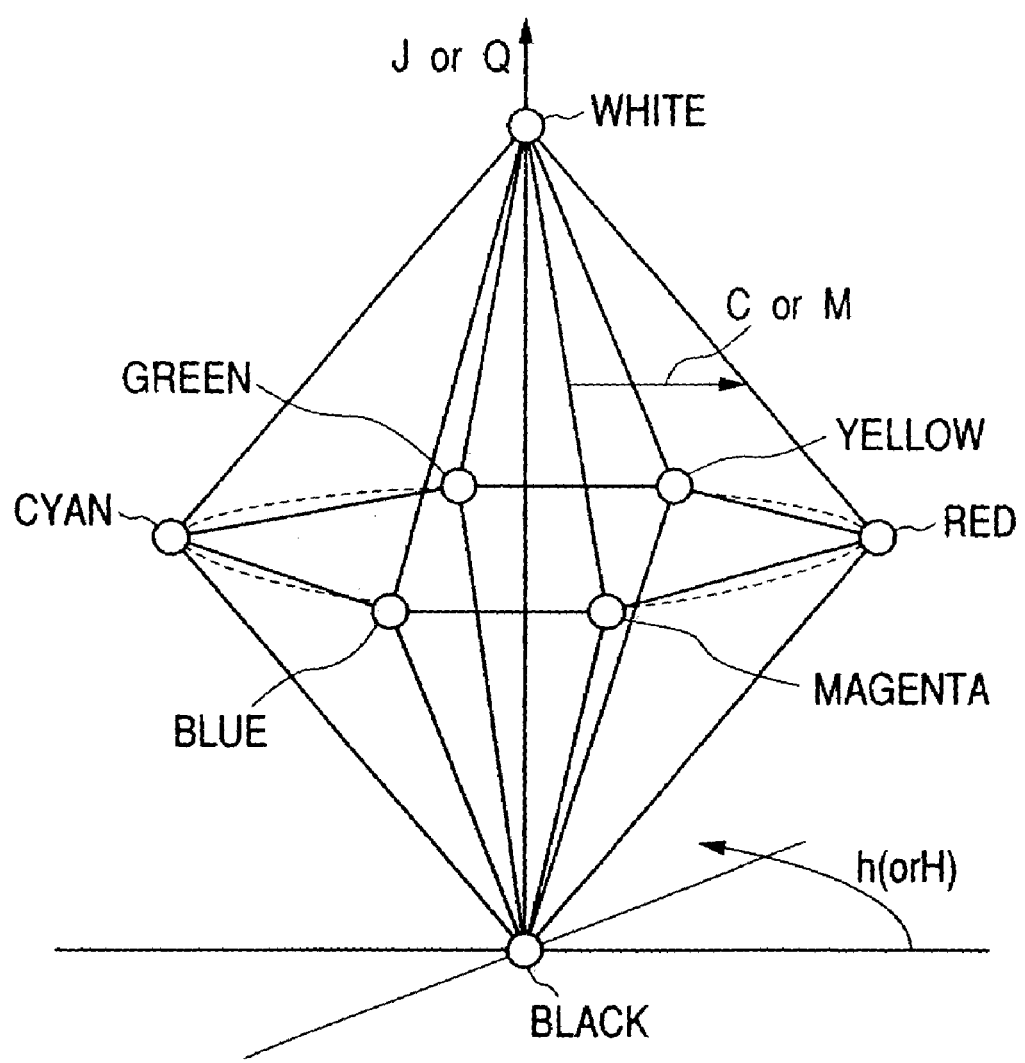
FIG. 7 is a diagram showing a dodecahedron approaching a color reproduction area.

The color reproduction range of the output device in the color perception space JCH or QMH is obtained as follows. For example, the XYZ values based on the environment light for eight points, i.e., red (C:0%, M:100%, Y:100%, K:0%), yellow (C:0%, M:0%, Y:100%, K:0%), green (C:100%, M:0%, Y:100%, K:0%), cyan (C:100%, M:0%, Y:0%, K:0%), blue (C:100%, M:100%, Y:0%, K:0%), magenta (C:0%, M:100%, Y:0%, K:0%), white (C:0%, M:0%, Y:0%, K:0%), and black (C:0%, M:0%, Y:0%, K:100%) are obtained by using the CMYK→XYZ (based on the environment light) relation data obtained in the step S84, and the obtained data is converted into the coordinate values of the human's color perception space JCH or QMH based on the observation condition 2 according to the color perception model. Thus, the color reproduction range of the output device can be approached by a dodecahedron as shown in FIG. 7.

In the color reproduction range approached by the dodecahedron, when points (e.g., an intermediate point between white and black on an achromatic color axis, and an input color signal point (JCH value or QMH value) of the inside/outside judgment target) inside the color reproduction range are on the same side, it is judged that these points are located inside the color reproduction range. Conversely, when these points are on the opposite sides, it is judged that these points are located outside the color reproduction range.

Figure 8A:
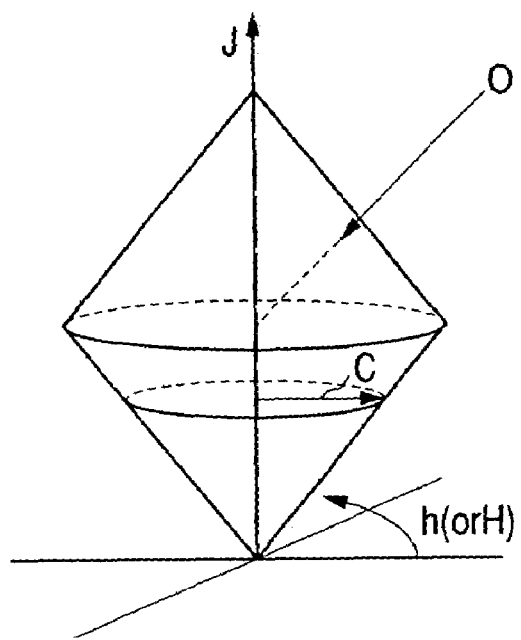
FIGS. 8A and 8B are diagrams showing a concept of color gamut mapping in a JCH color perception space.
Figure 8B:
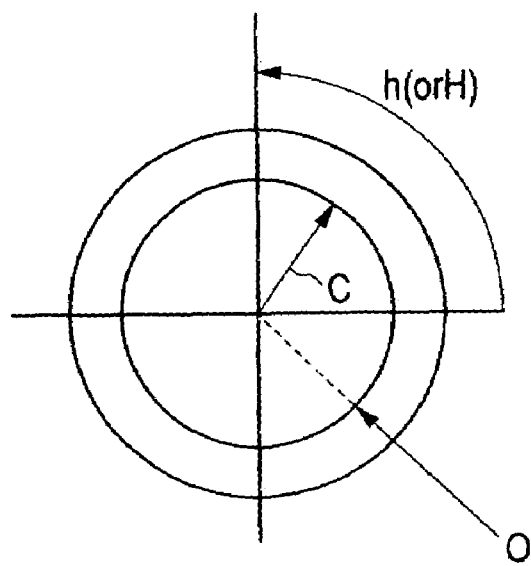
Figure 9A:
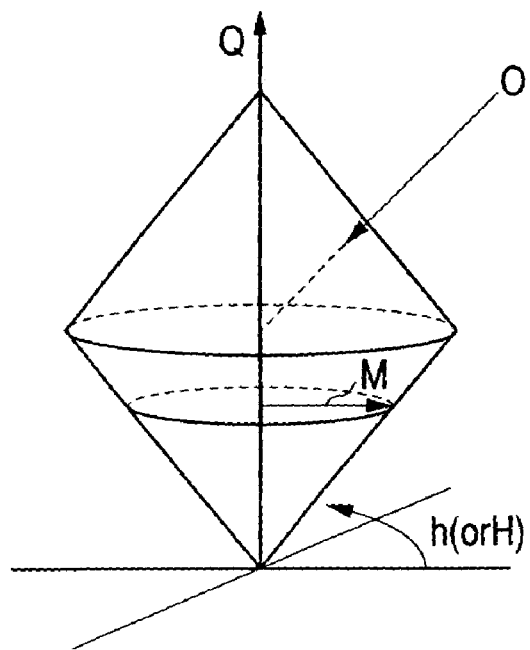
FIGS. 9A and 9B are diagrams showing a concept of color gamut mapping in the QMH color perception space.
Figure 9B:
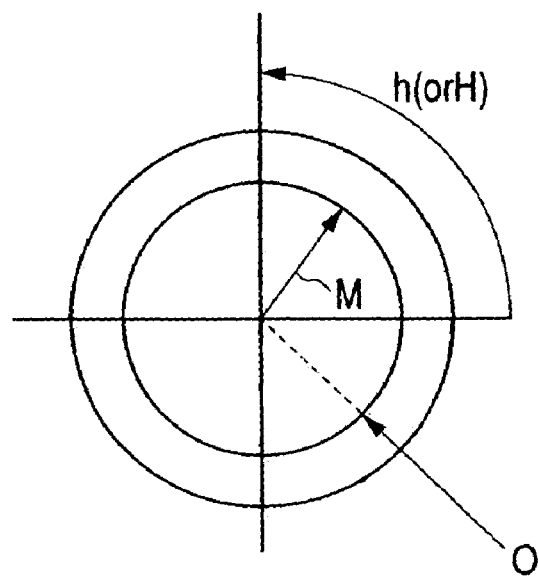

In a step S86, the color gamut mapping is performed on the basis of the result of the inside/outside judgment for the color reproduction range obtained in the step S85. FIGS. 8A and 8B are diagrams showing a concept of the color gamut mapping in the JCH color perception space, and FIGS. 9A and 9B are diagrams showing a concept of the color gamut mapping in the QMH color perception space. The input color signal which was judged to be outside the output-device color reproduction range in the above inside/outside judgment is mapped into the color reproduction range such that a hue angle h (or H) is conserved in the color perception space JCH or QMH. In the relative color matching, the result of such the mapping is stored in the LUT which manages the color perception space JCH as the input/output color space. In the absolute color matching, the result of such the mapping is stored in the LUT which manages the color perception space QMH as the input/output color space.

Figure 10A:
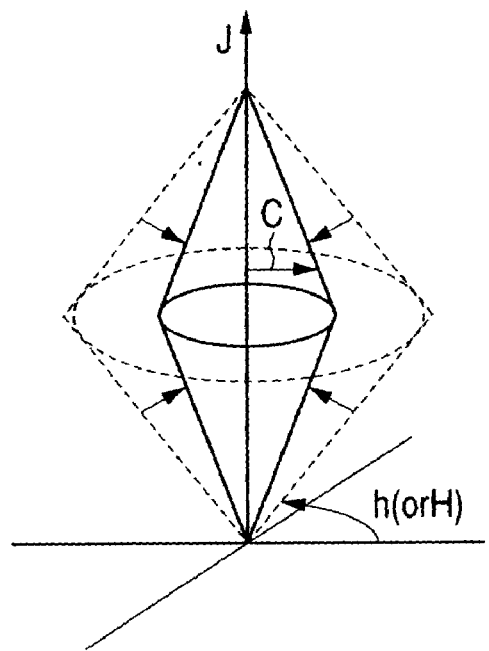
FIGS. 10A and 10B are diagrams showing a concept of color gamut mapping to be performed between different devices.
Figure 10B:
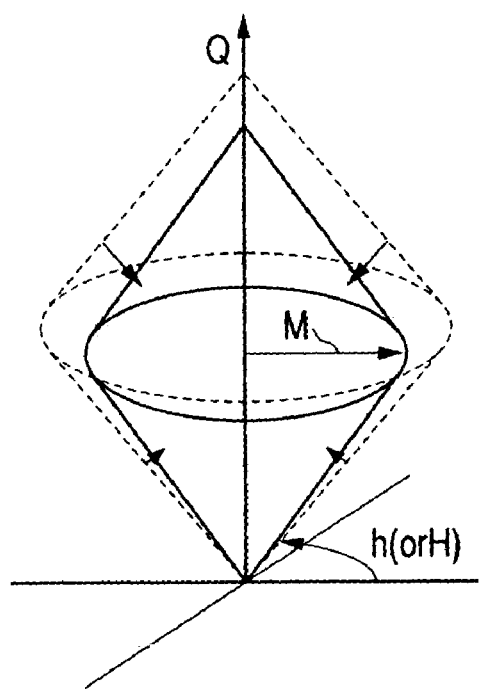

FIGS. 10A and 10B are diagrams showing a concept of the color gamut mapping to be performed between the different devices. In the drawings, the dotted line represents the color reproduction area of the input device, and the solid line represents the color reproduction area of the output device. In color perception space JCH, since the magnitude of the lightness J is normalized by the light source white points (sometimes referred as white points 1 and 2 hereinafter) of the observation conditions 1 and 2 respectively, the lightness J does not depend on the illumination levels (sometimes referred as illumination levels 1 and 2 hereinafter) of the observation conditions 1 and 2. On the other hand, in the color perception space QMH, the magnitude of the brightness Q is changed according to the illumination levels 1 and 2. Therefore, in the relative color matching, the white point 1 becomes the white point 2 as it is. On the other hand, in the absolute color matching, in case of the illumination level 1>the illumination level 2, the white point 1 is mapped to the white point 2, and in case of the illumination level 1<the illumination level 2, the white point 1 is output as gray because the white point 1 is lower than the white point 2.

[Data Generation Depending on Observation Condition 2]

Next, the conversion LUT 16 is generated by using the data generation unit 47.

Figure 11:
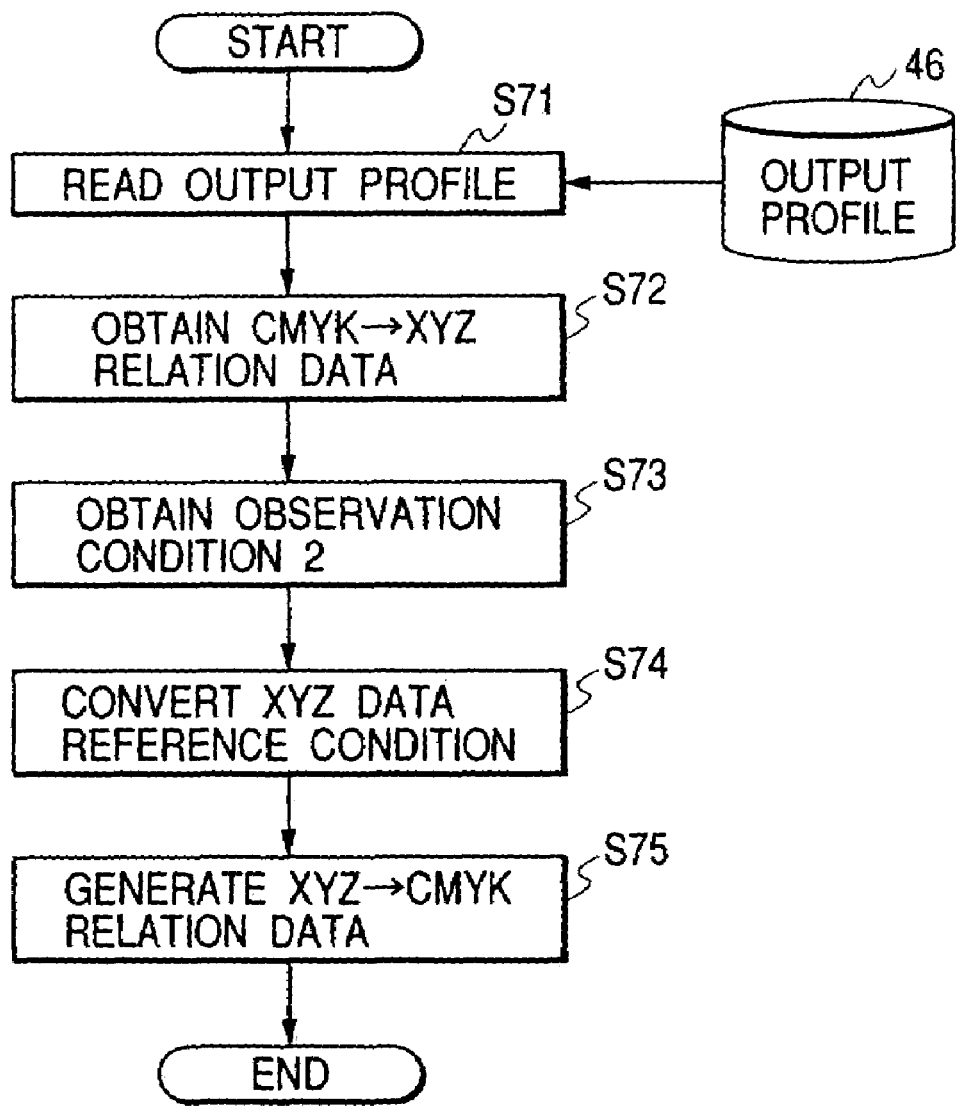
FIG. 11 is a flow chart showing a process example of restructuring a conversion LUT corresponding to environment light.

FIG. 11 is a flow chart showing a process example of restructuring the conversion LUT 16 corresponding to the environment light.

Generally, the conversion LUT (AtoB0 tag or the like) for converting the XYZ or Lab values into the device CMYK or RGB values has been stored in the ICC profile for the output device. It should be noted that the conversion LUT includes the color gamut mapping. However, since the XYZ values to be input to the LUT are the data based on the standard light D50 or D65, it is impossible to directly use this LUT as the conversion LUT according to the environment light.

Thus, as well as the color gamut mapping process, in a step S71 the conversion LUT (AtoB0 tag or the like) for performing the CMYK→XYZ conversion stored in the output profile 46 is read, and in a step S72 the CMYK→XYZ relation data is fetched from the conversion LUT. It should be noted that the CMYK values in the CMYK→XYZ relation data may be another device-dependent color such as the RGB values or another device-independent color such as the XYZ or Lab values. Next, in a step S73, the observation condition 2 prestored in the output profile is fetched.

Since the XYZ values of the fetched CMYK→XYZ relation data are the data based on the standard light D50 or D65, in a step S74 the XYZ values based on the measured color light source are adjusted into the XYZ values based on the environment light. Namely, the XYZ values based on the measured color light source are converted into the human's color perception space JCH on the basis of the color perception model according to the color measurement condition (the D50 light source white point "case based on D50", the illumination level, the ambient light state and the like). Then, the obtained values are inverse-converted into the XYZ values on the basis of the observation condition 2 (the D65 light source white point, the illumination level, the ambient light state and the like) different from the color measurement condition, whereby the XYZ values based on the measured color light source can be converted into the XYZ values based on the environment light.

Thus, since the relation from the device CMYK values to the XYZ values based on the environment light can be obtained, in a step S75 XYZ (based on the environment light)→CMYK relation data is optimized by a repetition method or the like on the basis of the CMYK→XYZ (based on the environment light) relation data, whereby the conversion LUT 16 corresponding to desired environment light can be obtained.

[Color Matching Execution]

Figure 12:
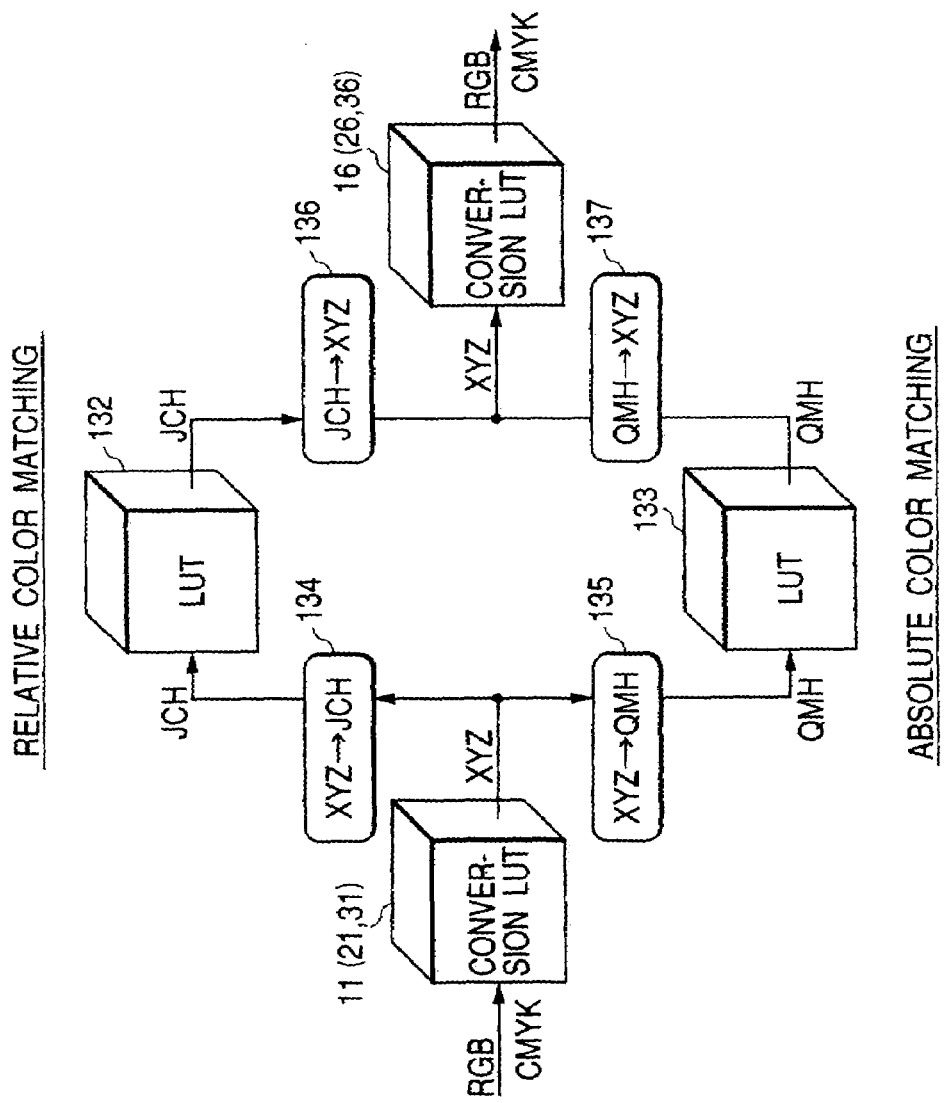
FIG. 12 is a diagram showing a concept of a color matching process.

FIG. 12 is a diagram showing a concept of the color matching process. In FIG. 12, numeral 11 denotes the conversion LUT which is generated based on the observation condition 1 by the data generation unit 41, numeral 132 denotes an LUT which is generated in the color perception space JCH by the color gamut mapping unit 44, numeral 133 denotes an LUT which is generated in the color perception space QMH by the color gamut mapping unit 45, and numeral 16 denotes the conversion LUT which is generated based on the observation condition 2 by the data generation unit 47.

Input RGB or CMYK color signals from the input device are converted into XYZ signals being the device-independent color signals by the conversion LUT 11. Then, the XYZ signals are converted into human's color perception signal JCH or QMH on the basis of the observation condition 1 (the D50 light source white point, the illumination level, the ambient light state and the like) by color perception model forward conversion units 134 and 135. The color perception space JCH is selected in case of the relative color matching, while the color perception space QMH is selected in case of the absolute color matching.

The color perception signals JCH and QMH are compressed into the color reproduction range of the output device (i.e., subjected to the color gamut mapping) by the LUT's 132 and 133 respectively. The color perception signals JCH and QMH subjected to the color gamut mapping are converted into the XYZ signals being the device-independent color signals on the basis of the observation condition 2 (the D65 light source white point, the illumination level, the ambient light state and the like) by color perception model inverse conversion units 136 and 137. Then, the XYZ signals are converted into the color signals depending on the output device in the observation condition 2 by the conversion LUT 134.

The RGB signals or the CMYK signals obtained in the above processes are sent to the output device, and the images represented by these signals are printed and output. When the printout is observed under the observation condition 2, a tint of the observed image can be seen or viewed to be the same as that of the original document observed under the observation condition 1.

In the above embodiment, the XYZ color space was explained as the device-independent color space. However, a device-independent RGB color space is often used instead of the XYZ color space (XYZ signals). Namely, the kind of device-independent color space can be arbitrarily designated by, e.g., the source profile.

The XYZ color space can be subjected to one-to-one linear conversion according to a 3×3 matrix to obtain the RGB color space, and the color reproduction range can be determined based on chromaticity of three primary color points and the standard white point. Further, in the case where the RGB color space is used as the input color space, the gray axis can be set on the diagonal axis of the three-dimensional LUT, whereby color misregistration of gray in tetrahedron interpolation can be prevented irrespective of the number of lattice points. On the other hand, in the case where the Lab color space or the like is used as the input color space, the gray axis is disposed on the lattice points when the number of lattice points in a-axis/b-axis directions of the three-dimensional LUT is odd, whereby any color misregistration of gray does not occur in the linear interpolation. However, when the number of lattice points is even, the color misregistration occurs in the linear interpolation.

On the basis of the chromaticity R(xr, yr), G(xg, yg), B(xb, yb) of the RGB three primary colors and the tristimulus values ($X_W$, $Y_W$1, $Z_W$1) of the standard white point, a conversion expression between the RGB color space and the XYZ color space is obtained by the following method.

$$zr = 1xr\, yr \quad (7)$$

$$zg = 1xg\, yg \quad (8)$$

$$zb = 1xb\, yb \quad (9)$$

$$\begin{bmatrix} Tr \\ Tg \\ Tb \end{bmatrix} = \begin{bmatrix} xr & xg & xb \\ yr & yg & yb \\ zr & zg & zb \end{bmatrix}^{-1} \begin{bmatrix} X_W \\ Y_W \\ Z_W \end{bmatrix} \quad (10)$$

$$\begin{bmatrix} X \\ Y \\ Z \end{bmatrix} = \begin{bmatrix} xr \cdot Tr & xg \cdot Tg & xb \cdot Tb \\ yr \cdot Tr & yg \cdot Tg & yb \cdot Tb \\ zr \cdot Tr & zg \cdot Tg & zb \cdot Tb \end{bmatrix} \begin{bmatrix} R \\ G \\ B \end{bmatrix} \quad (11)$$

$$\begin{bmatrix} R \\ G \\ B \end{bmatrix} = \begin{bmatrix} xr \cdot Tr & xg \cdot Tg & xb \cdot Tb \\ yr \cdot Tr & yg \cdot Tg & yb \cdot Tb \\ zr \cdot Tr & zg \cdot Tg & zb \cdot Tb \end{bmatrix}^{-1} \begin{bmatrix} X \\ Y \\ Z \end{bmatrix} \quad (12)$$

Figure 14:
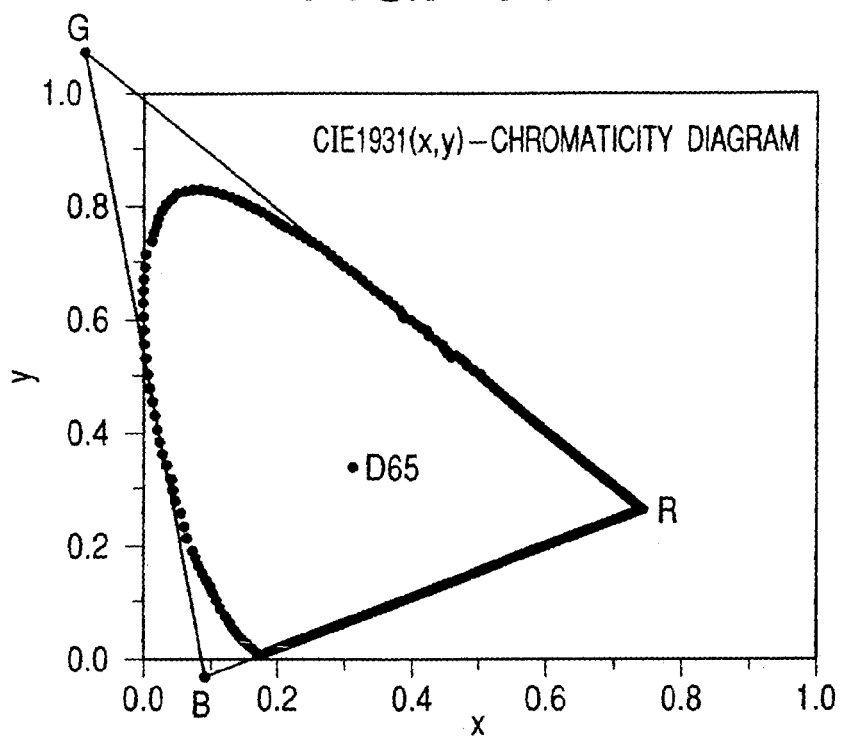
FIG. 14 is a diagram showing an RGB area including a human's entire visible area.

For example, the conversion matrix which is determined by the chromaticity (x, y) represented by expressions (13) to (15) and including a human's entire visible area as shown in FIG. 14 is given as represented by expressions (16) and (17), by using the expressions (7) to (12).

$$R(x, y) = (0.7347, 0.2653) \quad (13)$$

$$G(x, y) = (-0.0860, 1.0860) \quad (14)$$

$$B(x, y) = (0.0957, -0.0314) \quad (15)$$

$$\begin{bmatrix} X \\ Y \\ Z \end{bmatrix} = \begin{bmatrix} 0.895585 & -0.056474 & 0.111389 \\ 0.323396 & 0.713152 & -0.036548 \\ 0 & 0 & 1.089100 \end{bmatrix} \begin{bmatrix} R \\ G \\ B \end{bmatrix} \quad (16)$$

$$\begin{bmatrix} R \\ G \\ B \end{bmatrix} = \begin{bmatrix} 0.895585 & -0.056474 & 0.111389 \\ 0.323396 & 0.713152 & -0.036548 \\ 0 & 0 & 1.089100 \end{bmatrix} \begin{bmatrix} X \\ Y \\ Z \end{bmatrix} \quad (17)$$

Hereinafter, in order to distinguish the device RGB color space from the device-independent RGB color space, the RGB color space defined by the standard white point and the three primary colors of the expressions (13) to (15) is called a CRGB color space. Incidentally, the RGB three primary colors not depending on the device are not limited to those of the expressions (13) to (15).

For example, if CRGB values for the standard white point D65(X, Y, Z)=(0.9505, 1.0000, 1.0891) is represented by eight-bit quantization, (R, G, B)=(255, 255, 255) is given by using the expression (11).

Figure 15:
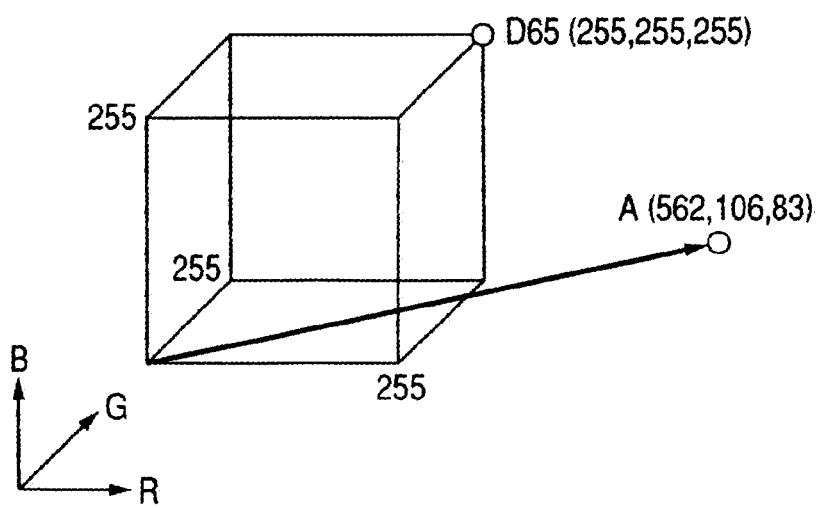
FIG. 15 is a diagram showing a dislocation of a gray axis in a case where a standard white point is fixed.

On the other hand, the values which are obtained by converting another standard white point A(X, Y, Z)= (1.098675, 1.000000, 0.355916) with use of the same expression are given as (R, G, B)=(562, 106, 83) in the eight-bit quantization, whereby overflow occurs. Even if all the colors can be represented, the gray axis is not disposed on a diagonal axis of the three-dimensional LUT for which the CRGB color space is used as the input color space, as shown in FIG. 15. Thus, there is some fear that color misregistration occurs in tetrahedron interpolation.

In the present embodiment, the conversion expression between the XYZ color space and the CRGB color space is dynamically formed according to the standard white point under the observation condition. Thus, it is possible to prevent overflow and underflow in the CRGB color space, and it is also possible to prevent that the color misregistration occurs in the tetrahedron interpolation because the gray axis is dislocated from the diagonal axis in the three-dimensional LUT.

Figure 16:
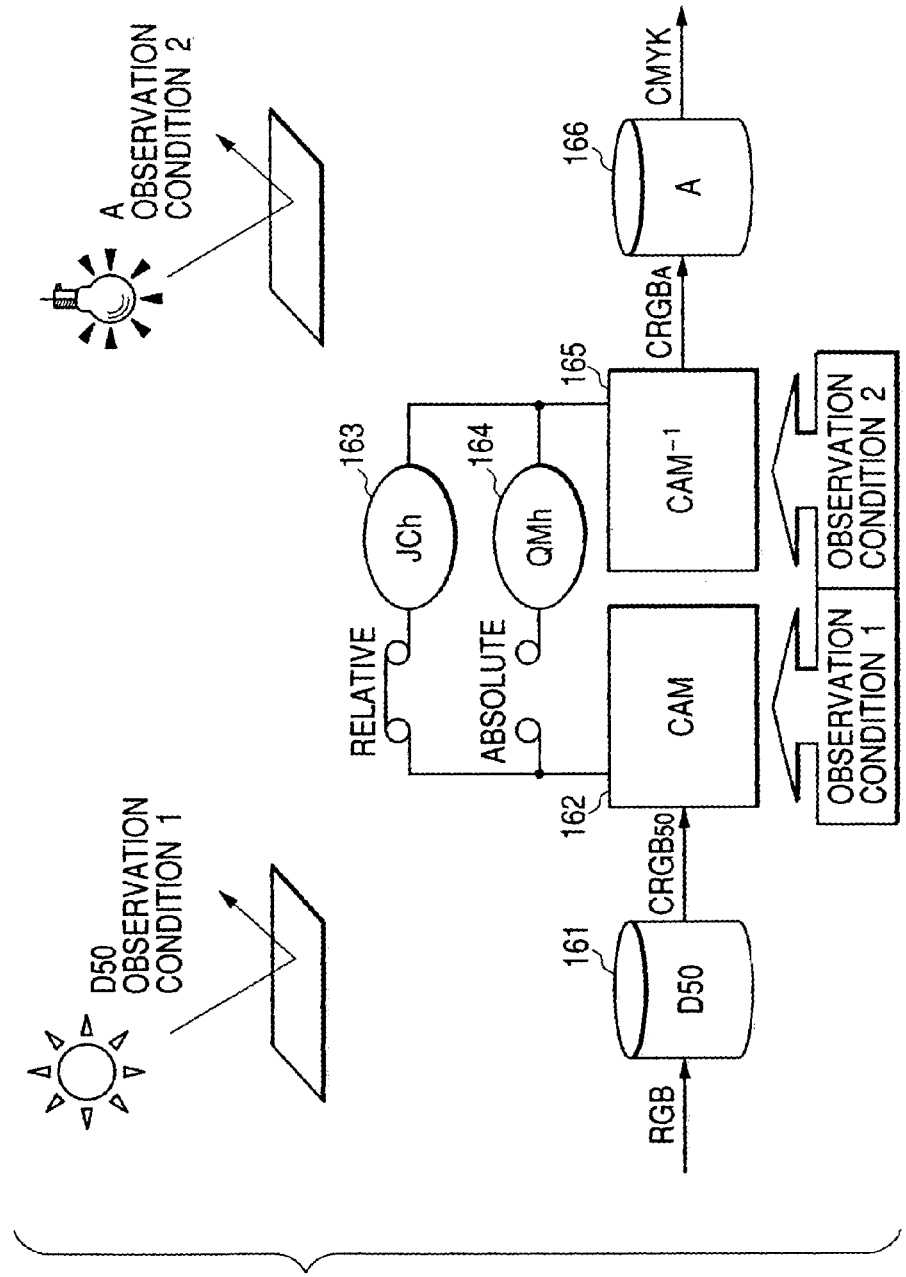
FIG. 16 is a diagram showing an example in which a CRGB color space according to an input-side standard white point and a CRGB color space according to an output-side standard white point are used in the present invention.

FIG. 16 is a diagram showing an example in which the conversion expression between the XYZ color space and the CRGB color space is dynamically formed according to the standard white point under the observation condition, and the color matching under the different observation conditions is performed.

In FIG. 16, numeral 161 denotes a profile for converting the device-dependent signals such as the RGB signals, the CMYK signals and the like into the CRGB signals based on the white point under the observation condition. The profile 161 is generated as follows.

Namely, the RGB→XYZ relation data is generated in the method by the data generation unit 41, and then the RGB→CRGB relation data can be obtained by applying the XYZ→CRGB conversion. Here, the XYZ→CRGB conversion matrix is given by the following expressions (18) and (19), on the basis of the CRGB three primary colors represented by the expressions (13) to (15) and the input-side standard white point D50(X, Y, Z)=(0.9642, 1.0000, 0.8249).

$$\begin{bmatrix} X \\ Y \\ Z \end{bmatrix} = \begin{bmatrix} 0.934492 & -0.054660 & 0.084368 \\ 0.337445 & 0.690237 & -0.027682 \\ 0 & 0 & 0.824900 \end{bmatrix} \begin{bmatrix} R \\ G \\ B \end{bmatrix} \quad (18)$$

$$\begin{bmatrix} R \\ G \\ B \end{bmatrix} = \begin{bmatrix} 0.934492 & -0.054660 & 0.084368 \\ 0.337445 & 0.690237 & -0.027682 \\ 0 & 0 & 0.824900 \end{bmatrix} \begin{bmatrix} X \\ Y \\ Z \end{bmatrix} \quad (19)$$

The obtained RGB→CRGB relation data is converted into LUT format or the like, and stored in the profile together with the input-side standard white point D50. The stored CRGB values are not limited to quantization precision of eight bits but may be quantization precision of 16 bits or the like. In the data generation unit 41, the XYZ values based on the measurement color light are corrected to the XYZ values based on the observation light by using the color perception model. However, when spectral reflectance of the color target and spectral distribution of the observation light can be obtained, the XYZ values based on the observation light can be directly obtained.

Numeral 166 denotes a profile for converting the CRGB signals based on the white point under the observation condition into device-dependent signals such as the RGB signals, the CMYK signals and the like. In the profile generation means, the RGB→XYZ relation data is generated in the method of the step S74 by the data generation unit 47, and then the RGB→CRGB relation data can be obtained by applying the XYZ→CRGB conversion. Here, the XYZ→CRGB conversion matrix is given by the following expressions (20) and (21), on the basis of the CRGB three primary colors represented by the expressions (13) to (15) and the input-side standard white point A(X, Y, Z) (1.098675, 1.0000, 0.355916).

$$\begin{bmatrix} X \\ Y \\ Z \end{bmatrix} = \begin{bmatrix} 1.110649 & -0.048376 & 0.036402 \\ 0.401055 & 0.610889 & -0.011944 \\ 0 & 0 & 0.355916 \end{bmatrix} \begin{bmatrix} R \\ G \\ B \end{bmatrix} \quad (20)$$

$$\begin{bmatrix} R \\ G \\ B \end{bmatrix} = \begin{bmatrix} 1.110649 & -0.048376 & 0.036402 \\ 0.401055 & 0.610889 & -0.011944 \\ 0 & 0 & 0.355916 \end{bmatrix} \begin{bmatrix} X \\ Y \\ Z \end{bmatrix} \quad (21)$$

In the data generation unit 47, the XYZ values based on the measurement color light is corrected to the XYZ values based on the observation light by using the color perception model. However, when spectral reflectance of the color patch and spectral distribution of the observation light can be obtained, the XYZ values based on the observation light can be directly obtained. The obtained RGB→CRGB relation data is converted into the CRGB→RGB relation data in the process of the step S75, and stored in the profile together with the output-side standard white point A. Further, as another method of generating the CRGB→RGB relation data from the RGB→XYZ relation data obtained in the method of the step S74 by the data generation unit 47, instead of the method of performing the inverse conversion by applying XYZ→CRGB conversion, there is a method of generating the XYZ→RGB relation data by the process of the step S75 and then applying the expression (20) in the pre-stage of the XYZ→RGB conversion.

The color matching for which the profile 161 storing the input-side standard white point D50 and the profile 166 storing the output-side standard white point A is as follows.

First, in the profile 161, the RGB or CMYK input color signals are converted into the CRGB signals based on the standard white point D50 by the conversion LUT or the like. The color matching means reads the input-side standard white point D50 stored in the profile 161, generates the CRGB→XYZ conversion matrix of the expression (18), and converts the CRGB signals based on the standard white point D50 into the XYZ signals. Next, the XYZ signals are converted into the human's color perception signal JCH or QMH on the basis of the observation condition 1 (the D50 light source white point, the illumination level, the ambient light state and the like) by color perception model forward conversion unit 134 or 135. Here, the color perception space JCH is selected in case of the relative color matching, while the color perception space QMH is selected in case of the absolute color matching.

The color perception signals JCH and QMH are compressed into the color reproduction range of the output device (i.e., subjected to the color gamut mapping) by the LUT's 132 and 133 respectively. The color perception signals JCH and QMH subjected to the color gamut mapping are then converted into the XYZ signals on the basis of the observation condition 2 (the A light source white point, the illumination level, the ambient light state and the like) by the color perception model inverse conversion unit 136 or 137. The color matching means reads the output-side standard white point A stored in the profile 166, generates the XYZ→CRGB conversion matrix of the expression (21), and converts the XYZ signals into the CRGB signals based on the standard white point A. Then, in the profile 166, the CRGB signals based on the standard white point A are converted into the RGB or CMYK output signals by the conversion LUT or the like.

Thus, by dynamically forming the conversion expression between the XYZ color space and the CRGB color space according to the standard white point under the observation condition, following effects can be given.

(1) The conversion matrix between the XYZ color space and the RGB color space according to the arbitrary standard white point is dynamically formed, and the device-independent color is represented in the RGB color space according to the standard white point, whereby it is possible to prevent overflow and underflow in case of the quantization in the RGB color space.

(2) Since the RGB color space according to the standard white point of the environment light is used as the input color space of the three-dimensional LUT, it is possible to dispose gray on the diagonal axis in the three-dimensional LUT, whereby it is possible to prevent the color misregistration in the tetrahedron interpolation irrespective of the number of lattice points.

Incidentally, in a case where the standard white point is not stored in the profile 161 or 166 when the color matching means is applied, e.g., the reference light D50 defined by the ICC profile is substituted for a default standard white point.

The feature of the present embodiment is as follows. Namely, in the color matching means, after the CRGB (or XYZ) signals under the observation condition 1 are converted into the human's color perception signal JCH or QMH by the color perception model forward conversion unit 134 or 135, the obtained signal is compressed (i.e., subjected to the color gamut mapping) into the color reproduction range of the output device by the LUT 132 or 133, and the compressed data is then converted into the CRGB (or XYZ) signals under the observation condition 2 by the color perception model inverse conversion unit 136 or 137. However, the place where the color gamut mapping is performed is not limited to that within the color matching means. Namely, it is possible not to perform the color gamut mapping in the color matching means but perform the color gamut mapping in the output-side profile. In this case, the CRGB (or XYZ) signals under the observation condition 1 are converted into the human's color perception signal JCH or QMH by the color perception model forward conversion unit 134 or 135, and the converted signal is converted into the CRGB (or XYZ) signals under the observation condition 2 by the color perception model inverse conversion unit 136 or 137 without any color gamut mapping. Then, when the output-side profile 166 is formed, the CRGB (or XYZ) signals under the observation condition 2 are again converted into the human's color perception signal JCH or QMH by the color perception model forward conversion unit 134 or 135, and the obtained signal is subjected to the color gamut mapping for the output device by the LUT 132 or 133. After then, the compressed signal is converted into the CRGB (or XYZ) signals under the observation condition 2 by the color perception model inverse conversion unit 136 or 137, and then converted into the RGB or CMYK output signals by the conversion LUT or the like.

Moreover, the further feature of the present embodiment is as follows. Namely, the color matching means dynamically forms the conversion matrix between the CRGB color space and the XYZ color space by using the standard white point of the observation light stored in the profile and the previously defined chromaticity of RGB three primary colors. However, the profile information for obtaining the above conversion matrix is not limited to the standard white point of the observation light. Namely, it is possible to prestore the conversion matrix between the CRGB color space and the XYZ color space according to the observation condition, as the profile information.

When the non-linear model such as the color perception model or the like is used to predict the XYZ values under the different light sources, there is a case where the gray under the input-side standard white point converted by the color matching does not represent the gray under the output-side standard white point. For example, in FIG. 16, if it is assumed that the CRGB values based on the standard light D50 being the input of a color perception model forward conversion unit 162 represent the CRGB signals of gray in which R=G=B is satisfied (chromaticity xy is the same as that of the light D50), and that the conversion by the color perception model conserves gray, the CRGB values based on the white point A being the output of a color perception model inverse conversion unit 165 should represent R=G=B (chromaticity xy is the same as that of the point A). However, since the color perception model is not linear actually, the gray might not be able to be conserved according to the combination of the input-side observation condition and the output-side observation condition.

In the present embodiment, the gray detection is performed to the input signal of the color perception model forward conversion unit, and the color matching process is performed such that the gray for the input signal is conserved even in the output signal of the color perception model inverse conversion unit. Namely, in the color matching process which performs the correction according to the observation condition, gray compensation to compensate gray color reproduction is performed. According to the present embodiment, the gray color reproduction can be improved.

Figure 17:
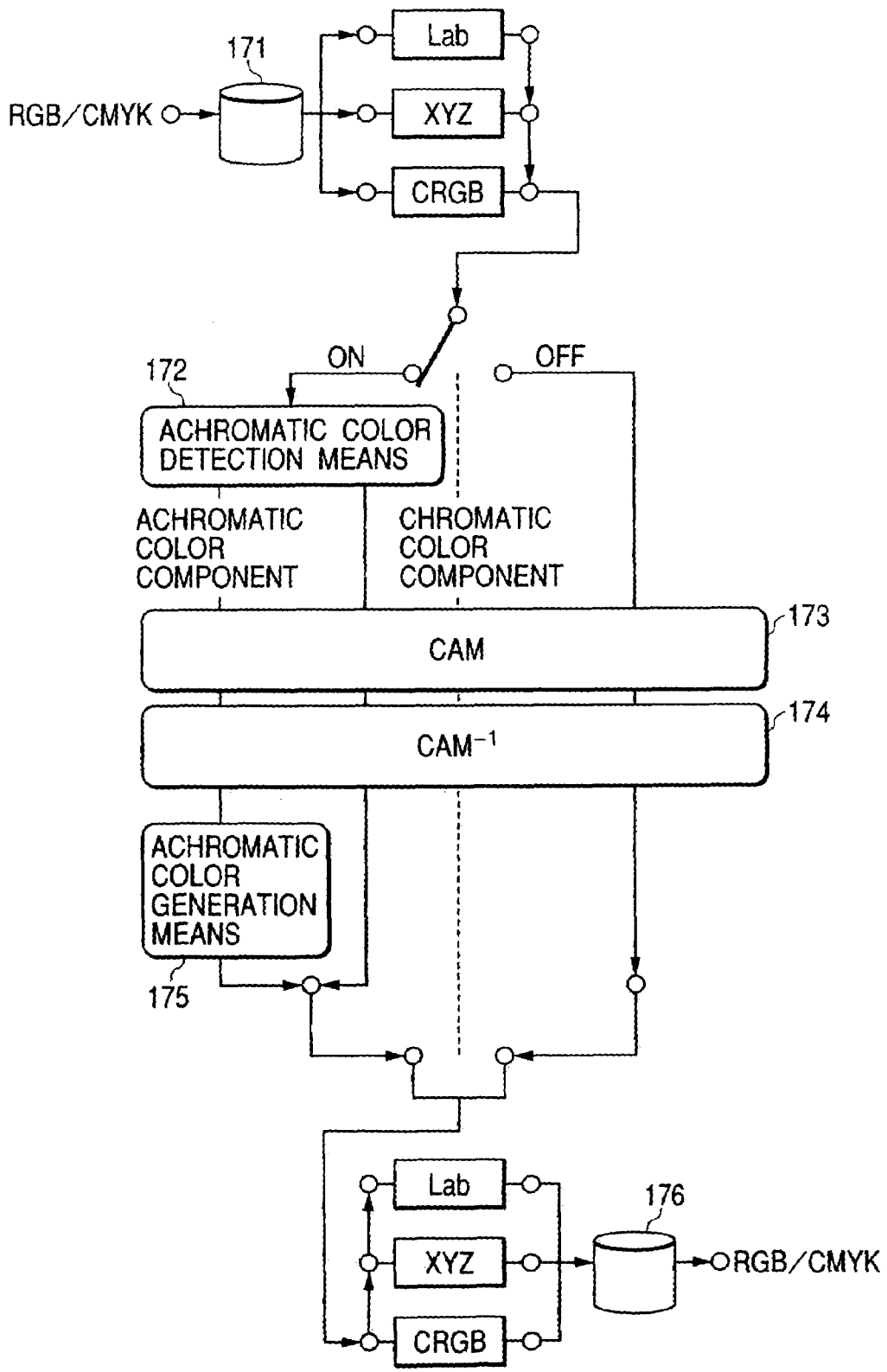
FIG. 17 is a diagram showing an example of gray compensation.

FIG. 17 shows an example in a case where the gray compensation process is applied to a color matching system in which a color space other than the CRGB color space can be set as the device-independent color space.

For example, if a PCS (profile connection space) of an input-side profile 171 is represented by the Lab values, a PCS of an output-side profile 176 is represented by the XYZ values, and the gray compensation is on, the following process is performed in the color matching means.

First, the RGB or CMYK signals are converted into the Lab signals by the input-side profile 171, and the Lab→XYZ conversion based on the input-side standard white point stored in the input-side profile is performed to convert the Lab signals into the XYZ signals. After then, as described above, the conversion matrix based on the input-side standard white point to perform the XYZ→CRGB conversion is formed, thereby converting the XYZ signals into the CRGB signals.

Next, the CRGB signals based on the input-side standard white point are separated into an achromatic color component and a chromatic color component by an achromatic color detection means 172.

Since the achromatic color component under the input-side standard white point satisfies R'=G'=B' in the CRGB color space, the input signal satisfying the condition R'=G'=B' is detected as the achromatic color component in the achromatic color detection means 172. Here, a certain tolerance is provided in the achromatic color detection condition because there is a case where such the condition does not satisfy R'=G'=B' due to a calculation error and the like.

As above, when the color space other than the CRGB color space is set as the device-independent color space, the process condition by the input-side profile is converted into the CRGB color space, and the achromatic color detection is performed. This is because the achromatic color detection can be easily performed in the CRGB color space.

Both the achromatic color component and the chromatic color component of the CRGB signals (R', G', B') based on the input-side standard white point are converted into the CRGB signals (R'', G'', B'') based on the output-side standard white point by a color perception model forward conversion unit 173 and a color perception model inverse conversion unit 174. After then, the CRGB signals (R'', G'', B'') corresponding to the achromatic color component detected by the achromatic color detection means 172 are further converted into the gray (Rg'', Gg'', Bg'') under the output-side standard white point by an achromatic color generation means 175.

The achromatic color generation means 175 performs, e.g., following conversion.

$$Rg''=Gg''=Bg''=(R''+G''+B'')/3 \qquad (22)$$

Next, as described above, the conversion matrix based on the output-side standard white point to perform the CRGB→XYZ conversion is formed, thereby converting the CRGB signals into the XYZ signals. Then, the XYZ signals are converted into the RGB signals or the CMYK signals by the output-side profile 176.

Gray compensation on/off controlling is achieved based on gray compensation flag information stored in the profile. For example, when a gray compensation on flag [1] is stored in the input-side profile and a gray compensation off flag [0] is stored in the output-side profile, MAX(1, 0) is obtained according to a following theory.

$$\text{MAX(input-side flag value, output-side flag value)} \qquad (23)$$

Thus, the gray compensation in the color matching becomes ON[1].

Further, the gray compensation need not be limited to the gray compensation on/off controlling. Namely, when a user interface such as a gray compensation check box or the like is provided on a printing setting panel or the like, a user can directly perform the gray compensation on/off controlling. For example, when on/off of the gray compensation is determined by the profile controlling as shown by the expression (23), an application or a device driver performs setting of profile flag information on the basis of on/off states of the gray compensation check box, whereby the user can remotely perform the gray compensation on/off controlling. Here, it is needless to say that the application or the device driver can directly control the gray compensation in the color matching means.

According to the present embodiment, the following effects can be obtained.

(1) Since the achromatic color signal under the input-side standard white point is detected from the device-independent input color signal and the detected achromatic color signal is then converted into the achromatic color signal under the output-side standard white point, it is possible to maintain gray reproducibility even if the non-linear color perception model is used in the color matching according to the observation condition.

(2) Since the conversion result of the color perception model is reflected when the achromatic color signal under the output-side standard white point is generated, it is possible to improve gray reproducibility in the color matching according to the observation condition.

(3) Since the achromatic color detection is performed to the CRGB color space which was converted by the dynamically-formed conversion expression, it is possible to perform the high-accurate and easy detection. Especially, the achromatic color detection can be performed based on the same standard, irrespective of the standard white point value. For example, in order to detect the achromatic color in the XYZ color space, it is necessary to detect the XYZ signals by which a chromaticity value xy becomes equal to the chromaticity value of the standard white point. Therefore, in a case where the standard white value can be arbitrarily set, the process becomes complicated.

Further, in the present embodiment, the achromatic color based on the standard white point is detected by using the CRGB color space. However, it is possible to detect the achromatic color by using another color space (e.g., an sRGB color space).

(Modifications)

In the above embodiment, the correction process according to the observation condition is performed by using the color perception model CIE CAM97s.

Figure 13:
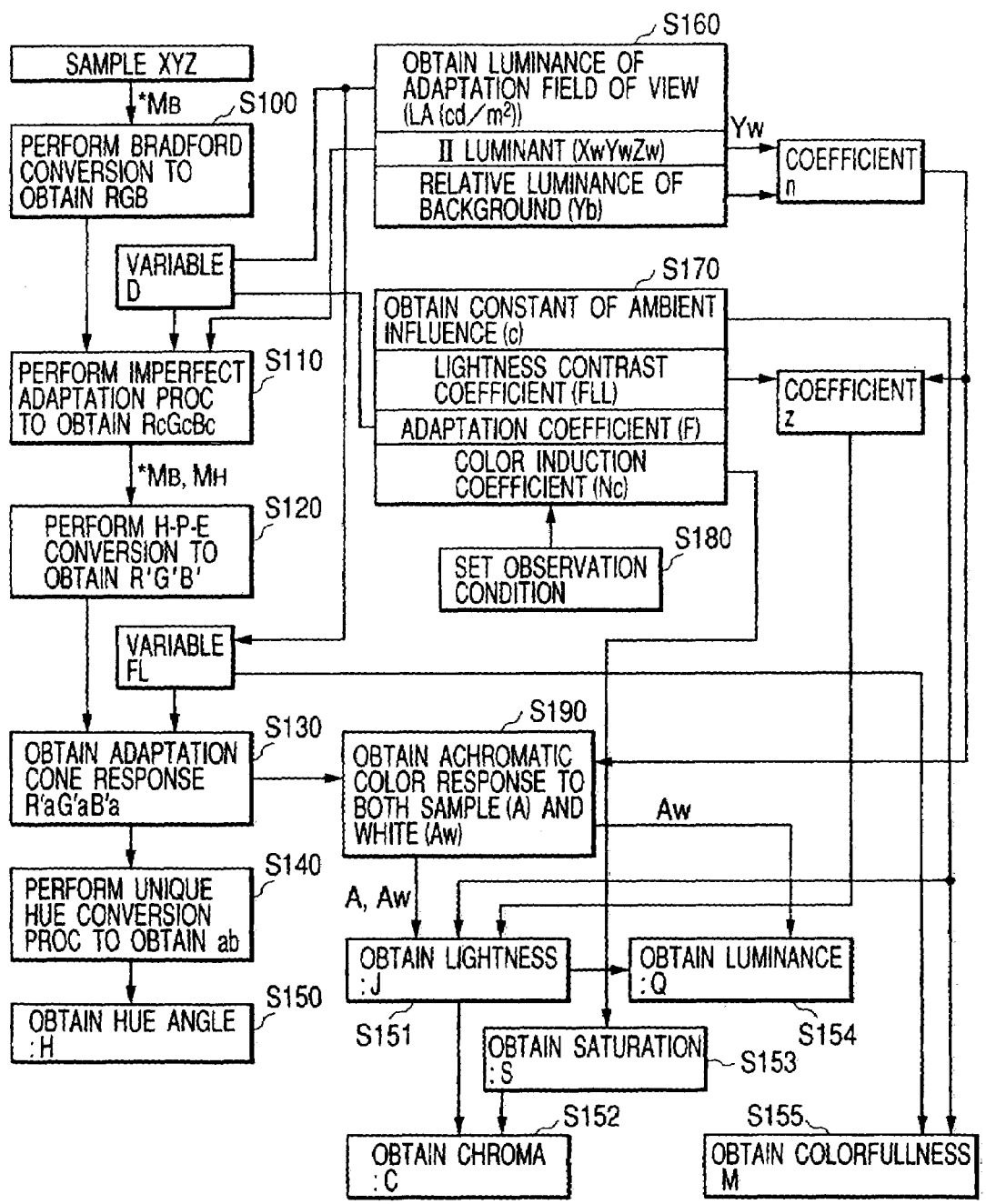
FIG. 13 is a flow chart for explaining a color perception model used in the embodiment of the present invention.

Although the color perception model CIE CAM97s can achieve high-precise correction, the processes are complex and it takes long time in this model as shown in FIG. 13.

On the other hand, in the ratio conversion and the Von Kries conversion, it does not take time as the processes are relatively simple, thereby achieving high-speed processes.

Therefore, in order to cope with user's usage, it is possible to provide in the system the correction processes according to the plural observation conditions.

When the non-linear process (CIE CAM97s) is selected, since there is some fear that color misregistration of gray occurs, gray compensation is performed. On the other hand, when the linear process (the ratio conversion, or the Von Kries conversion) is selected, since any color misregistration of gray does not occur, gray compensation is not performed.

By doing so, it is possible to appropriately combine the kinds of correction processes according to the observation conditions with the gray compensation process, thereby achieving an effective process.

The reproducibility of gray is more important in the graphics and the text rather than in the image.

Therefore, it is possible to first discriminate the kind of input object (or target) image and then control the gray compensation according to the discriminated result.

The discrimination of the kind of object image can be achieved by analyzing code information of the object image input from applications through an OS (operating system). For example, when the object image is represented in bit map format, this object image can be discriminated as the image. On the other hand, when the object image includes vector data or text commands, this object image can be discriminated as the graphics or the text.

As above, by controlling the gray compensation according to the kind of object image, it is possible to improve the color reproducibility.

OTHER EMBODIMENTS

The present invention is applicable to a system structured by plural devices (e.g., a host computer, an interface device, a reader, a printer, and the like) or to an apparatus structured by one device (e.g., a copying machine, a fax machine, or the like).

Further, it is needless to say that the object of the present invention can be attained in a case where a storage medium which stores a program code of software to achieve the functions of the above embodiments is supplied to a system or an apparatus, and a computer (or CPU or MPU) provided in this system or this apparatus reads and executes the stored program code. In this case, the program code itself read from the storage medium achieves the functions of the above embodiments, whereby the storage medium which stores the program code constitutes the present invention. Further, it is needless to say that the present invention includes not only the case where the functions of the above embodiments can be achieved by executing the program code read by the computer, but also a case where an OS (operating system) or the like running on the computer executes a part or all of the actual process based on an instruction of the program code and the functions of the above embodiments can be achieved by such the process.

Further, it is needless to say that the present invention includes a case where the program code read from the storage medium is written in a memory provided in a function expansion card inserted in the computer or a function expansion unit connected to the computer, and then based on an instruction of the program code, a CPU or the like provided in the function expansion card or the function expansion unit executes a part or all of the actual process and the functions of the above embodiment can be achieved by such the process.

What is claimed is:

1. An image processing method comprising the steps of:
receiving an input color image signal;
determining whether or not an input color image signal received in said receiving step represents achromatic color;
correcting the input color image signal according to an observation condition to produce a corrected input color image signal; and
converting, after said correcting step, the corrected input color image signal produced in said correcting step into an achromatic color image signal when it is determined in said determining step that the input color image signal represents achromatic color, and not converting the corrected input color image signal when it is determined in said determining step that the input color image signal does not represent achromatic color.

2. A method according to claim 1, wherein the input color image signal depends on an input-side observation condition and is device-independent.

3. A method according to claim 1, wherein the input color image signal is represented by an RGB color space according to a standard white point of input-side observation light.

4. A method according to claim 1, wherein, in said correcting step, the input color image signal, which depends on an input-side observation condition, is transformed into a corrected input color image signal, which depends on an output-side observation condition, and
wherein, when the input color image signal, which depends on the input-side observation condition, is determined in the determining step to represent achromatic color, the achromatic color image signal produced in the converting step by converting the corrected input color image signal produce in the correcting step, is an achromatic color signal according to a standard white point of output-side observation light.

5. A method according to claim 1, further comprising the step of converting transforming a device-dependent input color image signal into a device-independent input color image signal based on an input profile, and
wherein whether or not said transforming step is executed depends on information in the input profile.

6. A method according to claim 1, wherein whether or not said correcting step is executed depends on a user's manual instruction.

7. A method according to claim 1, wherein the converting step further comprises converting the corrected input color image signal produced in the correcting step into an output-device-dependent color image signal based on an output profile.

8. A method according to claim 1, further comprising the steps of:
obtaining a conversion condition for converting the input color image signal into a device-independent color space based on a standard white point of input-side light; and
converting the input color image signal according to the conversion condition,
wherein said determining step includes determining whether or not the converted input color image signal represents achromatic color.

9. A method according to claim 8, wherein the device-independent color space is defined by red, green and blue primary color components.

10. A method according to claim 1, wherein the correction of the input color image signal according to the observation condition in said correcting step is based on a color appearance model which performs a non-linear correction.

11. An image processing apparatus comprising:
an input unit adapted to receive an input color image signal;
an achromatic color detection unit adapted to determine whether or not an input color image signal received by said input unit represents achromatic color;
a correction unit adapted to correct the input color image signal according to an observation condition to produce a corrected input color image signal; and
a conversion unit adapted to convert the corrected input color image signal produced by the correction unit into an achromatic color image signal when it is determined by said achromatic color detection unit that the color image signal represents achromatic color, and not convert the corrected input color image signal when it is determined by said achromatic color detection unit that the input color image signal does not represent achromatic color.

12. A computer-readable storage medium storing a computer-readable program executing an image processing method, said program comprising:
code for receiving an input color image signal;
code for determining whether or not a received input color image signal represents achromatic color;
code for correcting the input color image signal according to an observation condition to produce a corrected input color image signal; and
code for converting the corrected input color image signal produced by execution of the code for correcting into an achromatic color image signal when it is determined that the input color image signal represents achromatic color, and not converting the corrected input color image signal when it is determined that the input color image signal does not represent achromatic color.

13. An image processing method comprising the steps of:
converting, based on an input profile, a first color image signal depending on an input device to a second color image signal which does not depend on the input device but which depends on an input-side observation condition;
converting, using a conversion condition according to a white point of the input-side observation condition, the second color image signal to a third color image signal composed of a red component, a green component, and a blue component;
determining whether or not the third color image signal represents achromatic color by determining whether or not the red component, the green component, and the blue component are approximately equal;
correcting, using a non-linear model according to the input-side observation condition and an output-side observation condition, the third color image signal to generate a fourth color image signal depending on the output-side observation condition;
converting the fourth color image signal into an achromatic color image signal when it is determined in said determining step that third color image signal represents achromatic color, and not converting the fourth color image signal when it is determined in said determining step that the third color image signal does not represent achromatic color; and
performing a conversion based on an output profile to generate an output-device-dependent color image signal.

14. An image processing method according to claim 13, wherein whether the conversion of the fourth color image signal is executed or not, is controlled based on information acquired from the input profile and information based on the output profile.

15. An image processing method according to claim 13, wherein said step of converting using a conversion condition according to a white point uses a standard white point.

16. A computer-readable storage medium storing a program executing an image processing method, said program comprising:
code for converting, based on an input profile, an input-device-dependent color image signal to an input-device-independent color image signal, which is depends on an input-side observation condition;
code for converting, using a conversion condition according to a white point of the input-side observation condition, the input-device-independent color image signal, which is depends on the input-side observation condition to an input-device-independent color image signal composed of a red component, a green component, and a blue component, and which depends on the input-side observation condition;
code for determining whether or not the third color image signal represents achromatic color by determining whether or not the red component, the green component, and the blue component are approximately equal;
code for correcting, using a non-linear model according to the input-side observation condition and an output-side observation condition, the third color image signal to generate a fourth color image signal depending on the output-side observation condition;
code converting the fourth color image signal into an achromatic color image signal when it is determined that third color image signal represents achromatic color, and not converting the fourth color image signal when it is determined that the third color image signal does not represent achromatic color; and
code for performing a conversion based on an output profile to generate an output-device-dependent color image signal.

17. A storage medium according to claim 16, wherein said code for converting using a conversion condition according to a white point, effects conversion that uses a standard white point.

18. An image processing apparatus comprising:
a first conversion unit adapted to convert, based on an input profile, a first color image signal depending on an input device into a second color image signal which does not depend on the input device and which depends on an input side observation condition;

a second conversion unit adapted to convert, using a conversion condition according to a standard white point of the input-side observation condition, the second color image signal into a third color image signal composed of a red component, a green component and a blue component;

a determination unit adapted to determine whether or not the third color image signal represents achromatic color by determining whether or not the red component, the green component and the blue component are approximately equal;

a correction unit adapted to correct, using a non-linear model according to the input-side observation condition and an output-side observation condition, the third color image signal to generate a fourth color image signal depending on the output-side observation condition;

a third conversion unit adapted to convert the fourth color image signal into an achromatic color image signal when it is determined by said determination unit that the third color image signal represents achromatic color, and not to convert the fourth color image signal when it is determined by said determination unit that the third color image signal does not represent achromatic color; and a fourth conversion unit adapted to perform a conversion based on an output profile to generate an output-device dependent color image signal.

* * * * *

UNITED STATES PATENT AND TRADEMARK OFFICE
CERTIFICATE OF CORRECTION

| | | |
|---|---|---|
| PATENT NO. | : 7,230,737 B1 | Page 1 of 1 |
| APPLICATION NO. | : 09/662756 | |
| DATED | : June 12, 2007 | |
| INVENTOR(S) | : Manabu Ohga | |

It is certified that error appears in the above-identified patent and that said Letters Patent is hereby corrected as shown below:

SHEET 13:

Figure 13, "COLORFULLNESS" should read --COLORFULNESS--.

COLUMN 9:

Line 36, Close up right margin; and
    Line 37, Close up left margin.

COLUMN 14:

Line 11, Close up right margin; and
    Line 12, Close up left margin.

COLUMN 20:

Line 50, "produce" should read --produced--.

COLUMN 22:

Line 30, "is" should be deleted; and
    Line 35, "is" should be deleted.

Signed and Sealed this

Fifteenth Day of April, 2008

JON W. DUDAS
*Director of the United States Patent and Trademark Office*